(12) United States Patent
Yoshikawa et al.

(10) Patent No.: US 7,079,182 B1
(45) Date of Patent: Jul. 18, 2006

(54) OPTICAL APPARATUS, OPTICAL APPARATUS DRIVING UNIT AND CAMERA SYSTEM

(75) Inventors: Kazumasa Yoshikawa, Utsunomiya (JP); Satoshi Natsume, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 1048 days.

(21) Appl. No.: 09/696,855

(22) Filed: Oct. 26, 2000

(30) Foreign Application Priority Data

Oct. 28, 1999 (JP) .................................. 11-307143
Oct. 28, 1999 (JP) .................................. 11-307144

(51) Int. Cl.
*H04N 5/262* (2006.01)
*G03B 17/00* (2006.01)
*H04N 5/232* (2006.01)

(52) U.S. Cl. .......................... 348/240.3; 348/240.99; 348/211.6; 396/76

(58) Field of Classification Search .............. 348/211.9, 348/211.6, 345, 347, 335, 357, 240.99, 240.3; 396/76, 86, 72, 79, 103
See application file for complete search history.

(56) References Cited

U.S. PATENT DOCUMENTS

| | | | | |
|---|---|---|---|---|
| 4,244,006 A * | 1/1981 | Kitahara et al. | .......... | 348/211.6 |
| 4,699,487 A * | 10/1987 | Kawamura et al. | .......... | 396/406 |
| 5,068,735 A * | 11/1991 | Tuchiya et al. | .......... | 348/211.9 |
| 5,311,230 A * | 5/1994 | Ogawa | .......... | 396/86 |
| 5,471,296 A * | 11/1995 | Parker et al. | .......... | 356/139.06 |
| 5,570,236 A | 10/1996 | Hirasawa | | |
| 5,572,317 A * | 11/1996 | Parker et al. | .......... | 356/139.06 |
| 5,650,819 A | 7/1997 | Sato et al. | | |
| 5,812,888 A | 9/1998 | Kirigaya et al. | | |
| 5,867,217 A * | 2/1999 | Okino et al. | .......... | 348/240.99 |
| 5,929,904 A * | 7/1999 | Uchida | .......... | 348/211.7 |
| 6,437,481 B1 * | 8/2002 | Senda et al. | .......... | 310/317 |
| 6,633,729 B1 * | 10/2003 | Yoshikawa et al. | .......... | 396/76 |
| 6,704,503 B1 * | 3/2004 | Yoshikawa et al. | .......... | 396/76 |
| 2003/0128288 A1 * | 7/2003 | Kawamura et al. | .......... | 348/335 |

FOREIGN PATENT DOCUMENTS

| | | |
|---|---|---|
| EP | 0 407 914 A2 | 7/1990 |
| JP | 03-013072 | 1/1991 |
| JP | 3-125569 | 12/1991 |
| JP | 08-234080 | 9/1996 |

(Continued)

OTHER PUBLICATIONS

European Search Report, Dec. 4, 2002.

(Continued)

*Primary Examiner*—Lin Ye
(74) *Attorney, Agent, or Firm*—Morgan & Finnegan, LLP

(57) ABSTRACT

The invention provides an optical apparatus comprising an optical member, a memory unit for memorizing preset speed information, and preset position information or preset direction information a memory instructing operation unit to be operated for causing the memory unit to memorize the preset speed information, and a control unit for executing preset drive control on the optical member, wherein the control unit is adapted to cause the memory unit to memorize arbitrary preset speed information, or arbitrary preset speed information and arbitrary preset direction information, in response to the operation of the memory instructing operation unit, and to drive the optical member either to a position corresponding to the memorized preset position information with a speed corresponding to the memorized preset speed information, or with a speed corresponding to the memorized preset speed information and with a direction corresponding to the memorized preset direction information.

32 Claims, 29 Drawing Sheets

| | FOREIGN PATENT DOCUMENTS | |
|---|---|---|
| JP | 11-023943 | 1/1999 |
| JP | 11-101932 | 4/1999 |
| JP | 11-103409 | 4/1999 |
| JP | 11-160604 | 6/1999 |
| JP | 11-267714 | 9/1999 |
| JP | 2000-284165 | 10/2000 |

OTHER PUBLICATIONS

Japanese Official Action.
Japanese Official Acction (Appeal).
Decision of Rejection.

\* cited by examiner

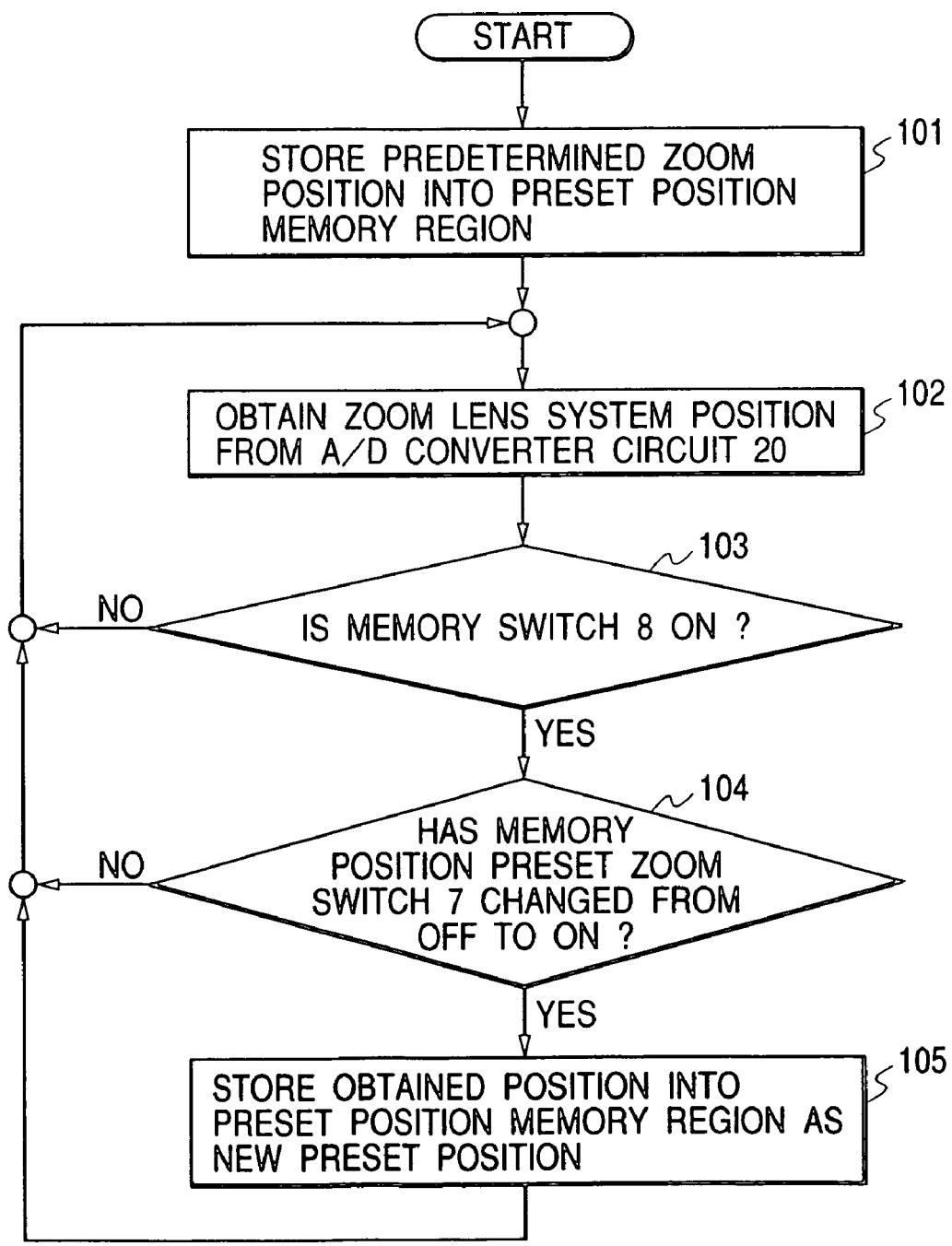

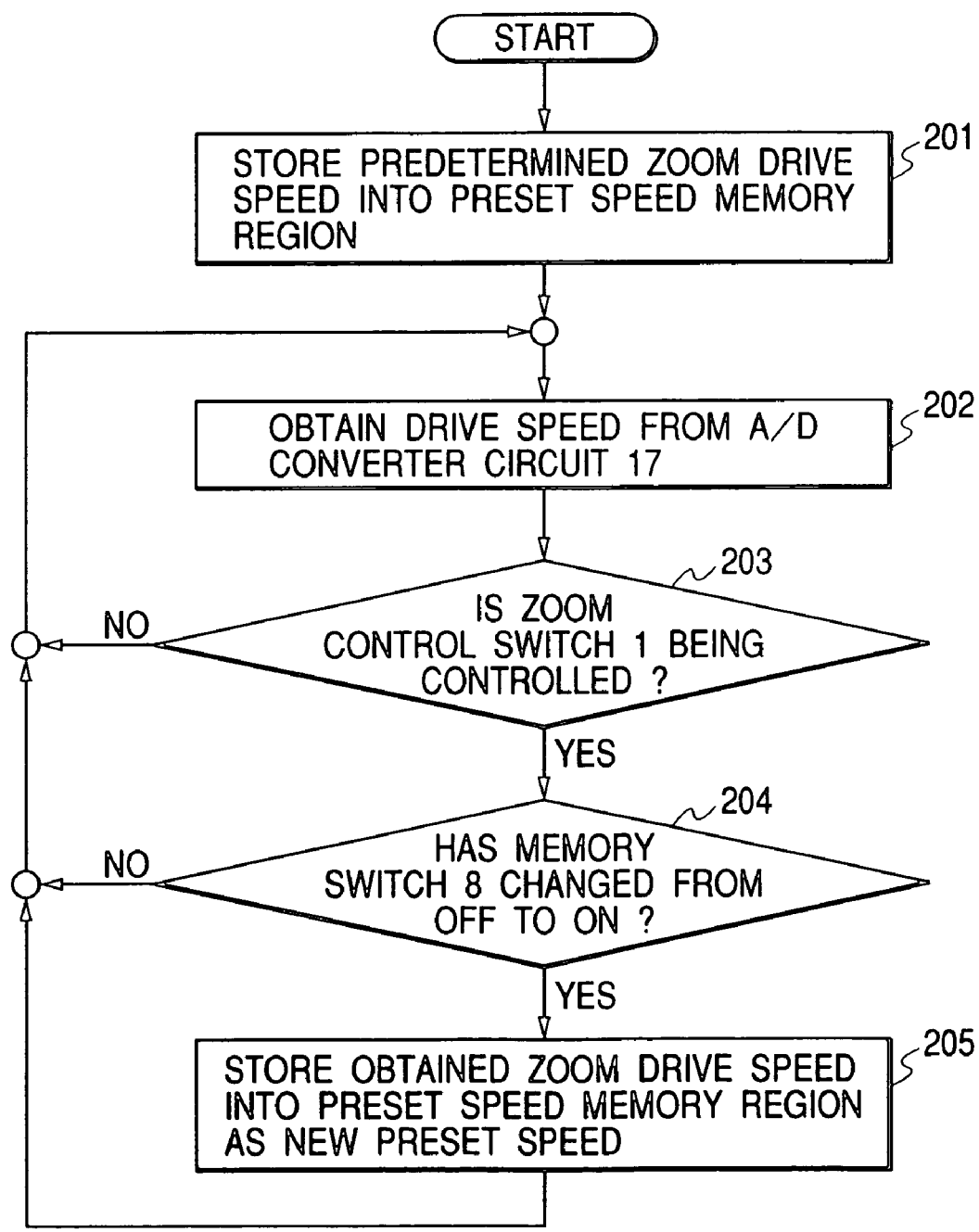

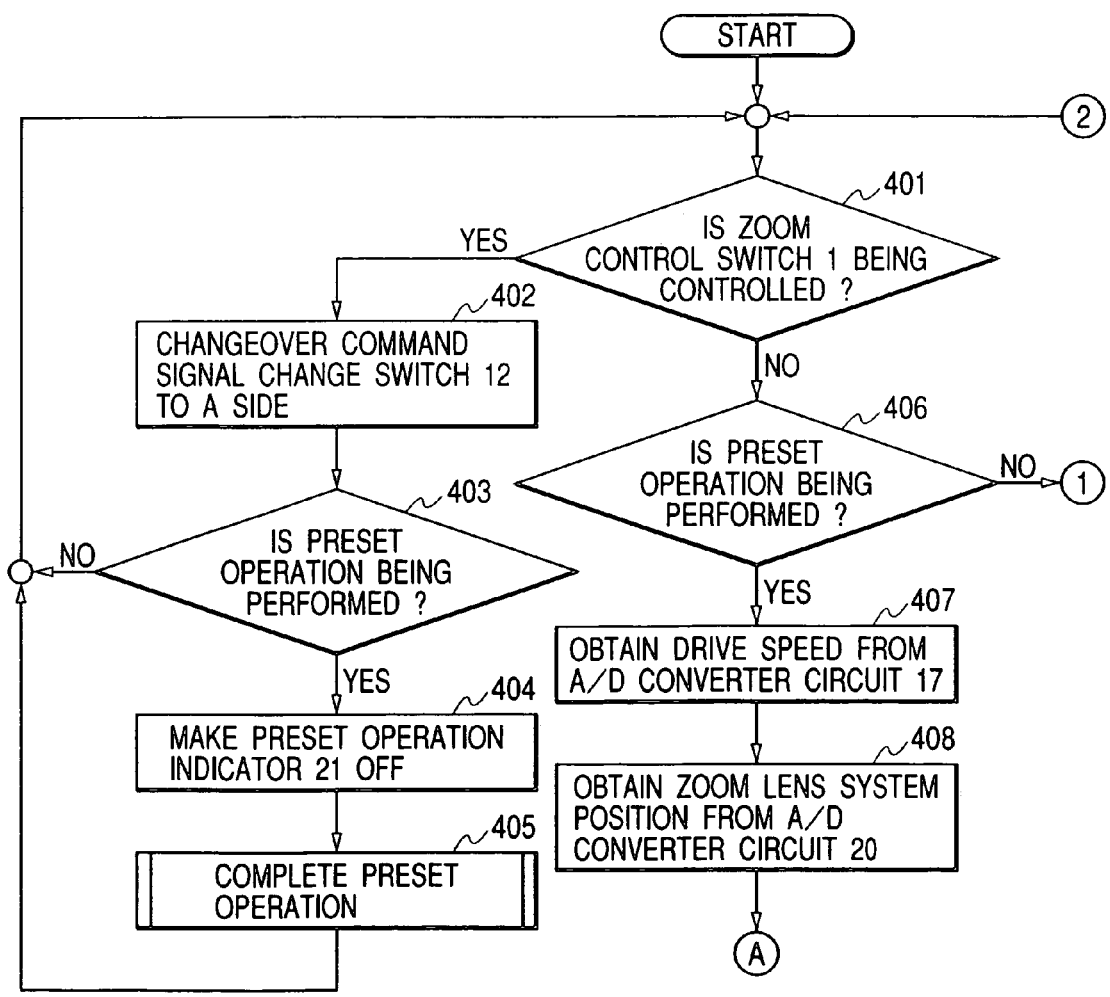

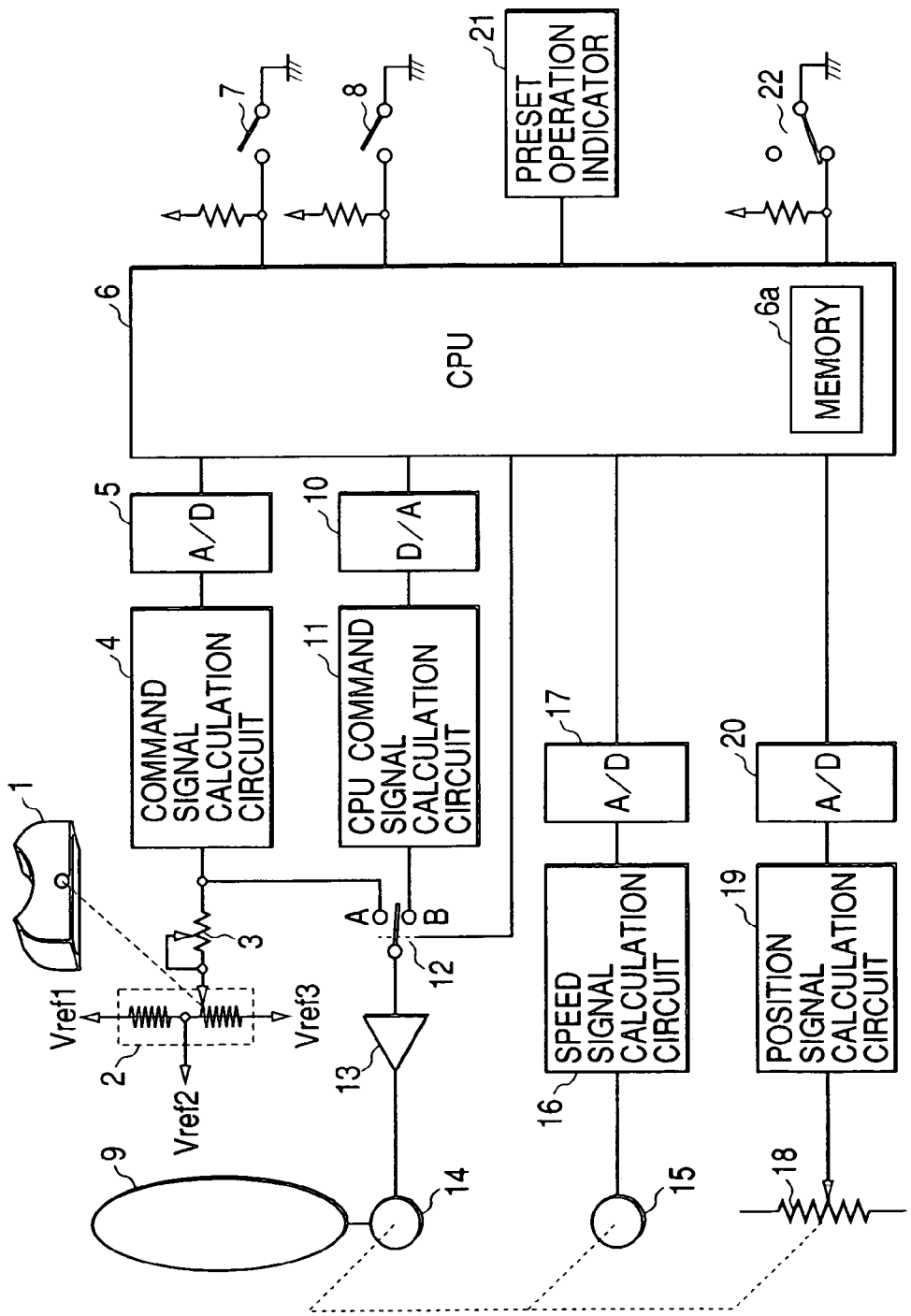

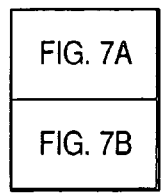
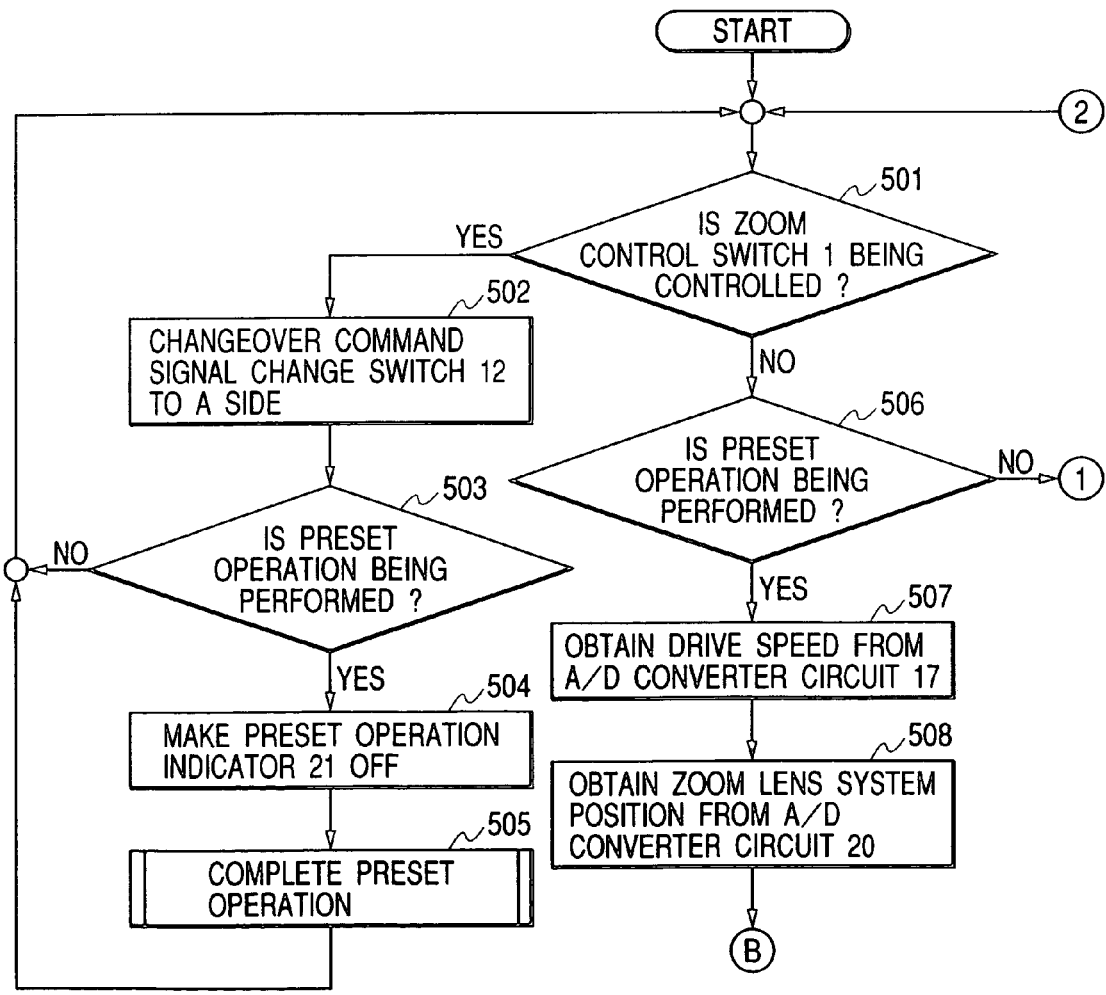
FIG. 7A

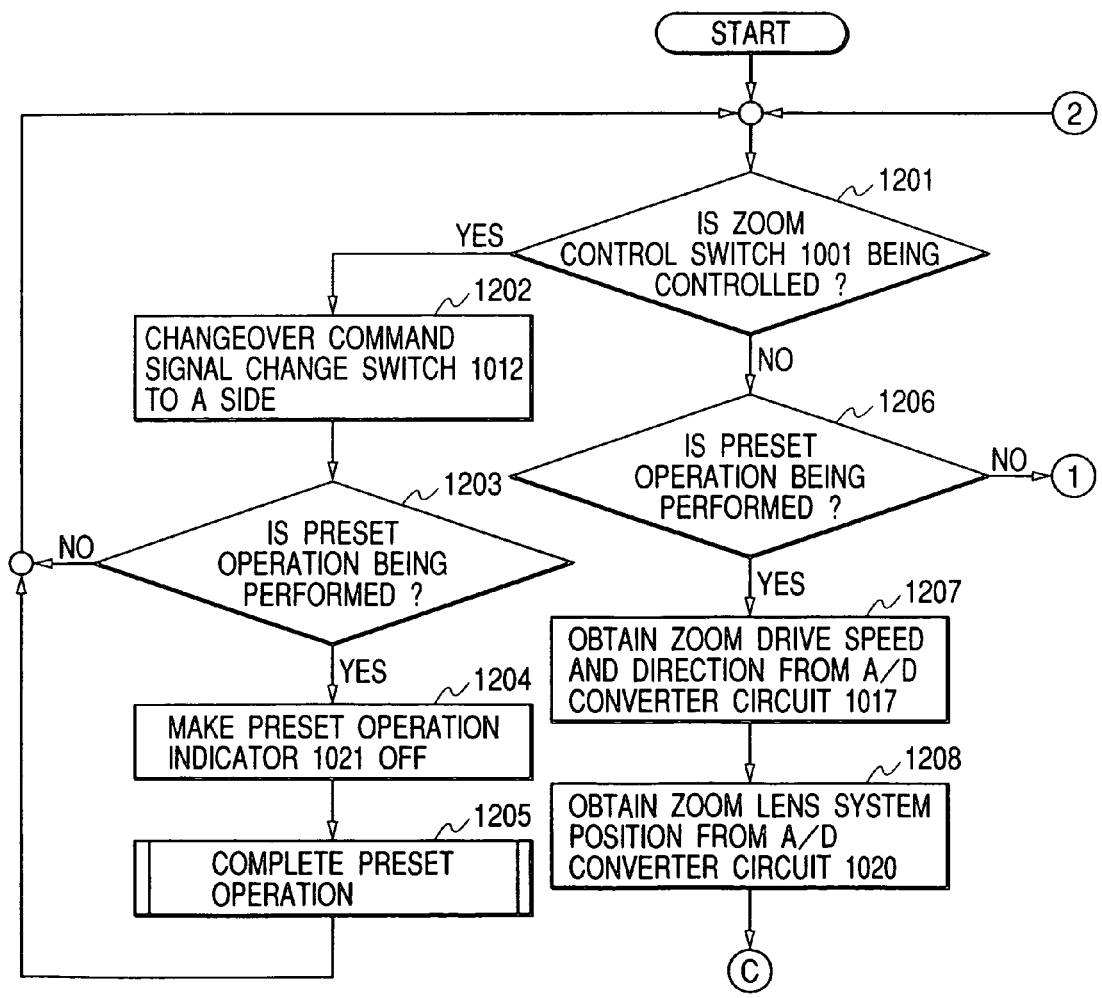

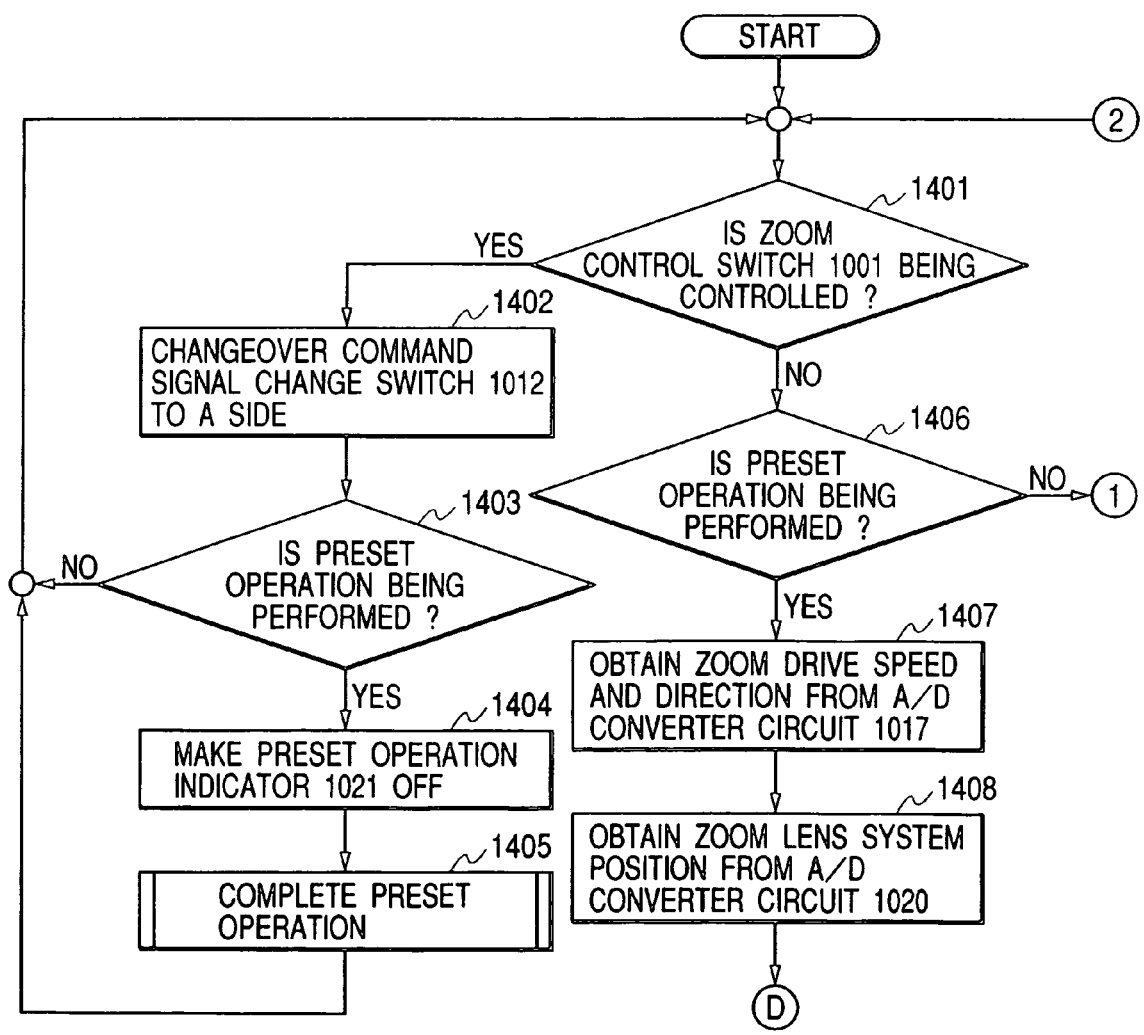

OPTICAL APPARATUS, OPTICAL APPARATUS DRIVING UNIT AND CAMERA SYSTEM

BACKGROUND OF THE INVENTION

1. Field of the Invention

The present invention relates to an optical apparatus and an optical apparatus driving unit adapted for use in a television camera, a video camera system or the like, and more particularly to a zoom lens apparatus adapted for use in an ENG camera system and a driving unit therefor.

2. Related Background Art

The zoom drive control utilizing a zoom control switch or a zoom demand in an optical apparatus such as the conventional zoom lens or video lens is disclosed for example in the Japanese Patent Application Laid-open No. 51-40924.

Such zoom drive control is achieved by servo means consisting of a drive system such as a motor and a control system for controlling the function of the drive system, and a zoom control switch or a zoom demand is utilized for providing the control system of such servo means with a command signal. In the actual zooming operation, the zooming speed can be adjusted from a low speed to a high speed as desired by the operator, by the amount of manipulation of the zoom control switch or a thumb ring provided in the zoom demand.

In the image taking operation with the television camera or the video camera, there are employed various image taking techniques and various functions are proposed for realizing such image taking techniques in a simpler and exact manner.

Among such functions, there is known a position preset drive control function, in which an arbitrary zoom position is memorized in advance as a preset position, and the optical system of the zoom lens is moved to such preset position by turning on a preset zoom switch in the course of an image taking operation.

Such function will be explained with reference to FIG. 24 which is an upper external view of a zoom lens for use in an ENG camera and FIG. 25 which is a lateral external view thereof.

As shown in FIGS. 24 and 25, on a lens-barrel portion (main body portion) of the zoom lens for the ENG camera, there is mounted a lens drive unit 31 incorporating therein motors for electrical zooming, focusing and iris control, position sensors, control circuits etc.

The drive unit 31 is also provided with a zoom control switch 1 for controlling the electrical zooming, a zoom speed controlling variable resistor 3 for variably setting the drive speed of the zooming optical system in relation to the manipulation amount of the zoom control switch 1, a memory switch 8 for instructing the memory of the preset position of the zoom lens, and a preset zoom switch 7 for instructing the start of the preset operation.

In the following there will be explained the setting of the preset position and the presetting operation in the actual use of the preset function.

The setting of the preset position is executed by the operator by moving the zoom lens to a desired preset position and turning on the memory switch 8, whereby the position of the zoom lens in such state is memorized as a preset position.

Also the preset operation is executed by the operator by turning on the preset zoom switch 7, whereby the zoom lens is electrically driven to the present position. The drive speed of the zoom lens in this operation is determined by the set position of the zoom speed controlling variable resistor 3.

The above-described conventional drive unit 31 is however associated with the following drawbacks, since the drive speed of the zoom lens in the preset operation is determined by the set position of the zoom speed controlling variable resistor 3, which variably setting the drive speed of the zoom lens in relation to the manipulation amount of the zoom control switch 1.

For example in case the operator wishes to execute the zoom lens drive with the maximum speed in case of operation with the zoom control switch 1 but with a medium speed in the preset operation, it is necessary to set the zoom speed controlling variable resistor 3 at the maximum speed during the manipulation of the zoom control switch 1, then to change the setting of the zoom speed controlling variable resistor 3 to a medium speed prior to the start of the preset operation, and to set the zoom speed controlling variable resistor 3 again at the maximum speed after the preset operation is completed.

Also the operability of the zoom control switch 1 may be deteriorated if the lower limit of the setting of the zoom speed controlling variable resistor 3 is selected excessively low. For this reason, the lower limit of setting of the zoom speed controlling variable resistor 3 is inevitably limited, so that the drive speed of the zoom lens in the preset operation cannot be made very low.

On the other hand, in taking the image with the television camera or the video camera, there is known a technique of taking the image while executing zooming at a constant low speed. Such image taking technique may be utilized repeatedly in the course of image taking.

Such zooming operation has been achieved by maintaining a constant manipulation amount of the zoom control switch or the thumb ring provided in the zoom demand.

It is however not easy for the operator to maintain such constant manipulation amount of the zoom control switch or the like during the course of zooming operation. Particularly, as the zoom drive speed becomes lower, there is required a longer time for maintaining the constant manipulation amount of the zoom control switch etc., so that it is very difficult to maintain the constant manipulation amount. It is also difficult to repeatedly reproduce the same zoom drive speed.

SUMMARY OF THE INVENTION

In consideration of the foregoing, a first invention of the present application provides an optical apparatus provided with an optical member or an optical apparatus driving unit to be mounted on or connected to the main body of the optical apparatus, comprising:

memory means for memorizing preset position information and preset speed information; memory instructing operation means to be operated for causing the memory means to memorize the preset speed information; and control means for effecting preset drive control on the optical member;

wherein the control means is capable of causing the memory means to memorize arbitrary preset speed information in response to the operation of the memory instructing operation means and causing the optical member to be driven to a position corresponding to the memorized preset position information with a speed corresponding to the memorized preset speed information.

Also a second invention of the present application provides an optical apparatus provided with an optical member or an optical apparatus driving unit to be mounted on or connected to the main body of the optical apparatus, comprising:

memory means for memorizing preset position information and preset direction information; memory instructing operation means to be operated for causing the memory means to memorize the preset speed information and the preset direction information; and control means for effecting preset drive control on the optical member;

wherein the control means is capable of causing the memory means to memorize arbitrary preset speed information and arbitrary preset direction information in response to the operation of the memory instructing operation means and causing the optical member to be driven with a speed corresponding to the memorized preset speed information in a direction corresponding to the preset direction information.

In a preferred embodiment, when the optical member is driven and the memory instructing operation means is operated, the control means causes the memory means to memorize, as the preset speed information, the actual drive speed of the optical member at the operation of the memory instructing operation means.

In a preferred embodiment, there is provided drive instructing operation means to be operated for generating a drive speed command for the optical member corresponding to an operation amount, and, when the drive instructing operation means and the memory instructing operation means are both operated, the control means causes the memory means to memorize, as the preset speed information, the drive speed command at the operation of the memory instructing operation means.

In a preferred embodiment, in the course of the above-mentioned preset drive control, the control means compares the actual drive speed of the optical member with the drive speed corresponding to the preset speed information, and increases or decreases the actual drive speed of the optical member in such a manner that the above-mentioned two speed substantially coincide.

In a preferred embodiment, there is provided display means for displaying that the above-mentioned preset drive control is being executed.

In a preferred embodiment, there is provided speed selecting operation means to be operated for selecting either the drive speed corresponding to the preset speed information or a maximum drivable speed for the drive speed of the optical member, and the control means is adapted to drive the optical member with the drive speed selected by the operation of the speed selecting operation means.

In a preferred embodiment, there is provided control starting operation means to be operated for starting the above-mentioned preset drive control.

In a preferred embodiment, the control means is adapted to interrupt the preset drive control in response to an operation on the control starting operation means in the course of the preset drive control.

In a preferred embodiment, there is provided drive instructing operation means to be operated for generating a drive command for the optical member according to at least either of the operation amount and the operation direction, and the control means is adapted to interrupt the preset drive control in response to an operation of the drive instructing operation means in the course of the preset drive control.

In a preferred embodiment, there is provided position detection means for detecting the actual drive position of the optical member, and the control means is adapted, in response to an operation of the memory instructing operation means, to cause the memory means to memorize, as the preset position information, the actual drive position of the optical member detected by the position detection means.

In a preferred embodiment, there is provided control starting operation means to be operated for starting the preset drive control, and, in response to the operations of the memory instructing operation means and the control starting operation means, the control means is adapted to cause the memory means to memorize, as the preset position information, the actual drive position of the optical member detected by the position detection means.

In a preferred embodiment, the control means is adapted, in response to the operation of the control starting operation means while the memory instructing operation means is operated or simultaneously with the operation thereof, to cause the memory means to memorized, as the preset position information, the actual drive position of the optical member detected by the position detection means.

In a preferred embodiment, when the optical member is driven and the memory instructing operation means is operated, the control means is adapted to cause the memory means to memorize, as the preset direction information, the actual drive direction of the optical member at the operation of the memory instructing operation means.

In a preferred embodiment, there is provided drive instructing operation means to be operated for generating a drive direction command for the optical member corresponding to the operating direction, and the control means is adapted, when the drive instructing operation means and the memory instructing operation means are both operated, to cause the memory means to memorize, as the preset direction information, the drive direction command at the operation of the memory instructing operation means.

In a preferred embodiment, there is provided a camera system consisting of an optical apparatus according to any of the foregoing embodiments, or an optical apparatus driving unit according to any of the foregoing embodiments and a main body of the optical apparatus, and a camera on which such optical apparatus is mounted.

BRIEF DESCRIPTION OF THE DRAWINGS

FIG. 2 is a memory setting flow chart for a preset position to be employed in the preset memory position zoom control in the above-mentioned lens apparatus;

FIG. 3 is a memory setting flow chart for a preset speed to be employed in the preset memory position zoom control in the above-mentioned lens apparatus;

FIG. 6 is a view showing the configuration of a lens apparatus constituting a second embodiment of the present invention;

DETAILED DESCRIPTION OF THE PREFERRED EMBODIMENTS

First Embodiment

Figure 1:
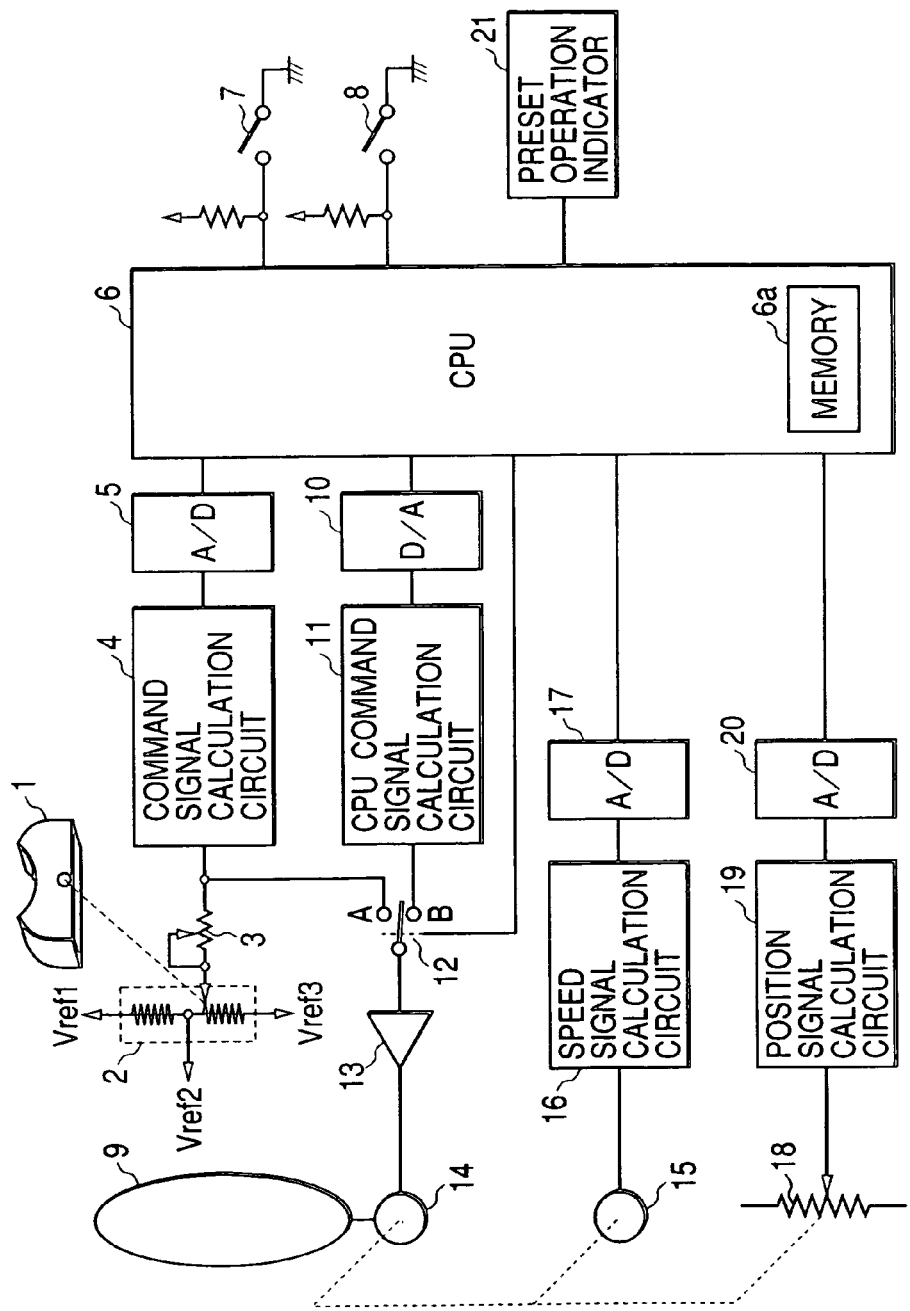
FIG. 1 is a view showing the configuration of a lens apparatus constituting a first embodiment of the present invention.
Figure 24:
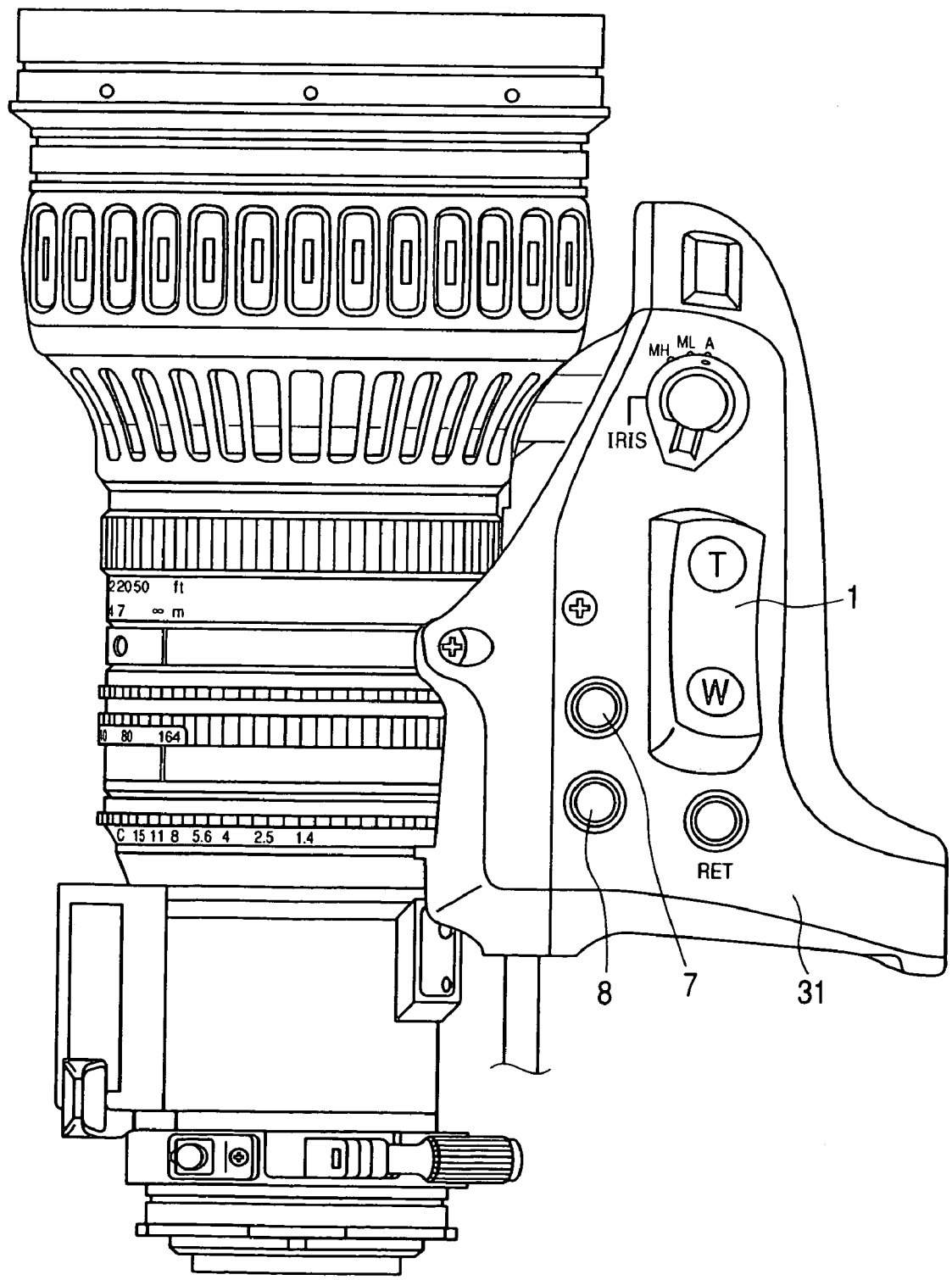
FIG. 24 is a plan view of a conventional lens drive unit.
Figure 25:
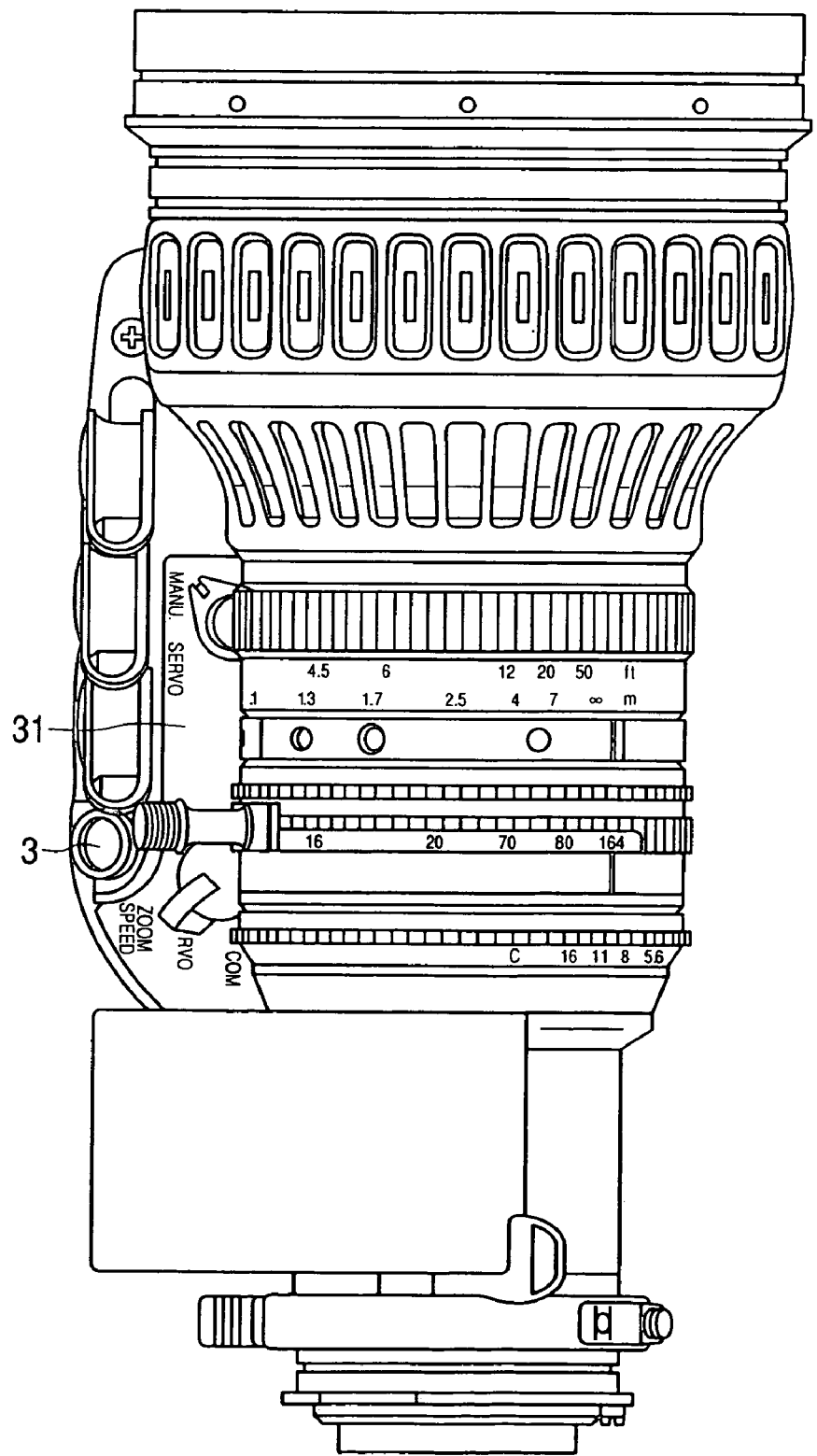
FIG. 25 is a lateral view of a conventional lens drive unit.

FIG. 1 shows the configuration of a lens apparatus (optical apparatus) constituting a first embodiment of the present invention, wherein components equivalent in function to those shown in FIGS. 24 and 25 are represented by symbols same as in FIGS. 24 and 25.

A zoom control switch (instructing operation means) 1 is to be operated by the photographer or operator. A command signal generation circuit 2 generates a command signal for instructing a drive direction and a drive speed (which may also be a drive amount or a drive position) corresponding to the operation amount of the zoom control switch 1 in order to electrically drive a zooming optical system (optical adjustment means) 9 for executing the zooming adjustment of the lens apparatus.

A zoom speed controlling variable resistor 3 changes the drive speed of the zooming optical system 9 corresponding to the operation amount of the zoom control switch 1. A command signal calculation circuit 4 executes signal level shifting on the command signal for fetching in an A/D conversion circuit 5. An A/D conversion circuit 5 converts the analog signal outputted from the command signal calculation circuit 4 into a digital signal.

A CPU 6 controls the functions of the present lens apparatus and is provided therein with a memory (memory means) 6*a* capable of memorizing a preset position (preset position information) and a preset speed (preset speed information). The CPU 6 also executes "preset memory position zoom control (preset position/speed drive control)" for executing drive to the preset position memorized in the memory 6*a* with the memorized preset speed.

A memory switch (memory instructing operation means) 8 is used for providing the CPU 6 with an instruction for memory of the preset position and the preset speed to be employed in the "preset memory position zoom control".

A preset memory position zoom switch (control starting operation means) 7 has a position memorizing function for causing the memory 6*a* to memorized the preset position upon being turned on after or simultaneous with the turning-on of the memory switch 8, and a function of instructing the start (and interruption) of the control operation upon being turned on after the memory of the preset position.

There are also provided a D/A converting circuit 10 for converting the digital command signal, outputted for driving the zooming optical system 9 into an analog signal; a CPU command signal calculation circuit 11 for shifting the signal level of the command signal outputted from the D/A converting circuit 10; and a command signal selector switch 12 for selecting whether the zooming optical system 9 is driven by the zoom control switch 1 or by the CPU 1.

There are also provided a power amplifier circuit 13 for activating a motor 14 for driving the zooming optical system 9; a speed detector 15 for outputting a speed signal corresponding to the drive speed of the zooming optical system 9; a speed signal calculation circuit 16 for shifting the signal level of the speed signal for fetching into an A/D conversion circuit 17; and an A/D conversion circuit 17 for converting the analog signal, outputted from the speed signal calculation circuit 16, into a digital signal.

There are also provided a position signal detector (position detection means) 18 for outputting a position signal according to the position of the zooming optical system 9; a position signal calculation circuit 19 for shifting the signal level of the position signal for fetching into an A/D conversion circuit 20; and an A/D conversion circuit 20 for converting the analog signal, outputted from the position signal calculation circuit 19, into a digital signal.

A preset operation indicator 21 provides visual indication whether the "preset memory position zoom control" executed.

The preset memory position zoom switch 7 and the memory switch 8 may be provided integrally in the main body of the lens apparatus having the zooming optical system 9 and an unrepresented focusing optical system, or in a zoom demand (external control unit) which is connected to the main body of the lens apparatus for example through a cable and is provided for example with a thumb ring functioning in place for the zoom control switch 1.

Also the above-described components other than the zooming optical system 9, namely the zoom control switch 1, circuits such as the CPU 6, motor 14, speed detector 15, position detector 18, preset memory position zoom switch 7 and memory switch 8, may be provided in a lens drive unit (optical apparatus driving unit) which is to be mounted on or connected to the main body of the lens apparatus of handy type, as shown in FIGS. 24 and 25.

In the lens apparatus or the lens drive unit of the above-described configuration, it is necessary to motor drive the zooming optical system 9 to the preset position as a preliminary operation for memorizing the preset position, or to motor drive in advance the zooming optical system 9 for memorizing the preset speed.

In the following there will be explained the drive control for the zooming optical system from the zoom control switch 1. When the zoom control switch 1 is operated, the command signal generation circuit 2 generates a command signal for instructing the drive direction and the drive speed (which may also be drive amount or drive position), corresponding to the operation amount of the switch. The command signal is entered into the power simplifying circuit 13 through the zoom speed controlling variable resistor 3, which varies the drive speed of the zooming optical system 9 according to the operation amount of the zoom control switch 1, and the side A of the command signal selector switch 12, and is then entered into the motor 14 after amplification to a predetermined level by the power amplifying circuit 13, whereby the motor 14 is activated to drive the zooming optical system 9.

The position of the zooming optical system 9 required for memorizing the preset position can be detected by the entry of the output of the position detector 18 into the CPU 6 through the position signal calculation circuit 19 and the A/D conversion circuit 20.

Also the actual drive speed of the zooming optical system 9, required for memorizing the preset speed, can be detected by the entry of the output of the speed detector 15 into the CPU 6 through the speed signal calculation circuit 16 and the A/D conversion circuit 17.

Also the discrimination whether the zoom control switch 1 is operated, required in memorizing the preset speed, can be achieved by the entry of the command signal, outputted from the command signal generation circuit 2 according to the operation amount of the zoom control switch 1, into the CPU 6 through the zoom speed controlling variable resistor 3, the command signal calculation circuit 4 and the A/D conversion circuit 5.

In the following there will be explained a memory setting sequence for the preset position and the preset speed, required in executing the "preset memory position zoom control".

At first there will be explained the memory setting sequence for the preset position. In this memory setting sequence, the operator in advance moves the zooming optical system 9 to a desired preset position and, after turning on the memory switch 8, shifts the preset memory position zoom switch 7 from the off-state to the on-state, whereby the CPU 6 memorizes, as the preset position, the position of the zooming optical system 9 (actual position detected through the position detector 18) when the preset memory position zoom switch 7 is shifted from the off-state to the on-state.

The process of the CPU 6 in the above-described sequence will be explained with reference to FIG. 2. At first, as an initialization, a predetermined zoom position, such as the wide angle end, is memorized as a preset position in a preset position memory area provided in the memory 6a (step S101). The preset position in such initialization may also be the position of the zooming optical system 9 when the power supply of the lens apparatus is turned on, or a position of the zooming optical system 9 desired by the operator, or a position of the zooming optical system 9 selected while the lens apparatus is powered previous time.

Then the position of the zooming optical system 9 is acquired from the A/D conversion circuit 20 (step S102). Then there is discriminated whether the memory switch 8 is turned on (step S103), and, if not turned on, the position of the zooming optical system 9 is acquired again from the A/D conversion circuit 20 (step S102).

If the memory switch 8 is turned on, there is discriminated whether the preset memory position zoom switch 7 has been shifted from the off-state to the on-state (step S104), and, if not shifted, the sequence returns to the step S102.

If the preset memory position zoom switch 7 has been shifted from the off-state to the on-state, the position of the zooming optical system 9 acquired in the step S102 is memorized as a new preset position in the preset position memory area (step S105).

In the following there will be explained the memory setting sequence for the preset speed. In this memory setting sequence, the operator operates the zoom control switch 1 to drive the zooming optical system 9 at a speed desired for presetting, and shifts the memory switch 8 from the off-state to the on-state in such drive state, whereupon the CPU 6 memorizes the drive speed of the zooming optical system 9 (actual drive speed of the zooming optical system 9 detected through the speed detector 15) as the preset speed.

The process of the CPU 6 in the above-described sequence will be explained with reference to FIG. 2. At first, as an initialization, a predetermined zoom drive speed, such as the maximum speed, is memorized as a preset speed in a preset speed memory area provided in the memory 6a (step S201). The preset speed in such initialization may also be a zoom drive speed desired by the operator, or a zoom drive speed set in the course of power supply of the lens apparatus previous time.

Then the drive speed of the zooming optical system 9 is acquired from the A/D conversion circuit 17 (step S202). Then there is discriminated whether the zoom control switch 1 is operated by acquiring the data of the A/D conversion circuit 5 (step S203), and, if not operated, the zoom speed is acquired again from the A/D conversion circuit 17 (step S202).

If the zoom control switch 1 is operated, there is discriminated whether the memory switch 8 has been shifted from the off-state to the on-state (step S204), and, if not shifted, the sequence returns to the step S202.

If the memory switch 8 has been shifted from the off-state to the on-state, the speed of the zooming optical system 9 acquired in the step S202 is memorized as a new preset speed in the preset speed memory area (step S205).

In the following there will be explained the operation of the "preset memory position zoom control" (hereinafter simply called "preset operation"). In such preset operation, the zooming optical system 9 is controlled by the entry of the command signal from the CPU 6 into the motor 14 through the D/A conversion circuit 10, the CPU command signal calculation circuit 11, the side B of the command signal selector switch 12 and the power amplifying circuit 13, whereby the zooming optical system 9 is driven to the preset position to the preset speed.

Figure 4B:
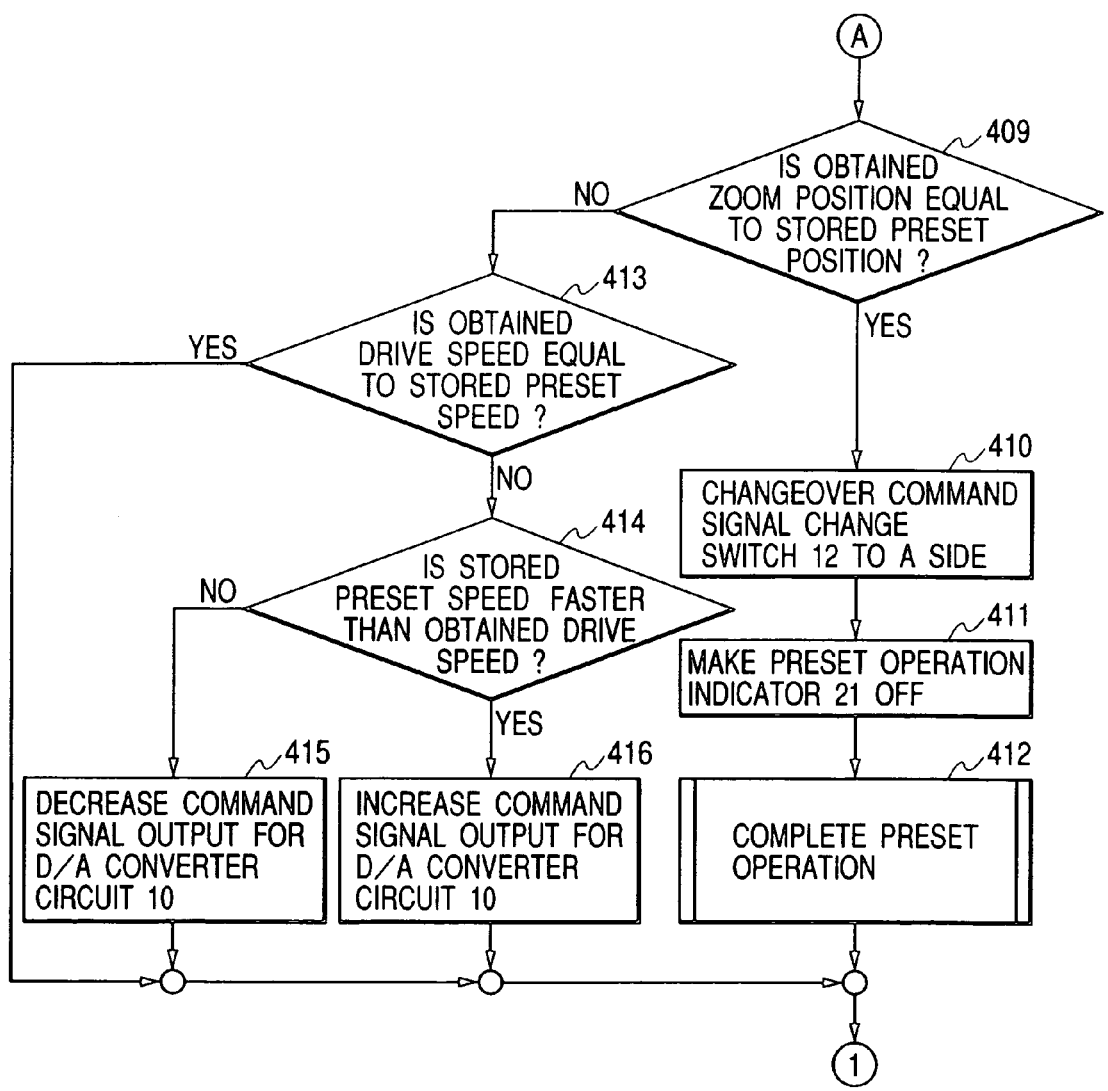
FIG. 4, which is comprised of FIGS. 4A and 4B, and FIG. 5 are process flow charts of the preset memory position zoom control in the above-mentioned lens apparatus.
Figure 5:
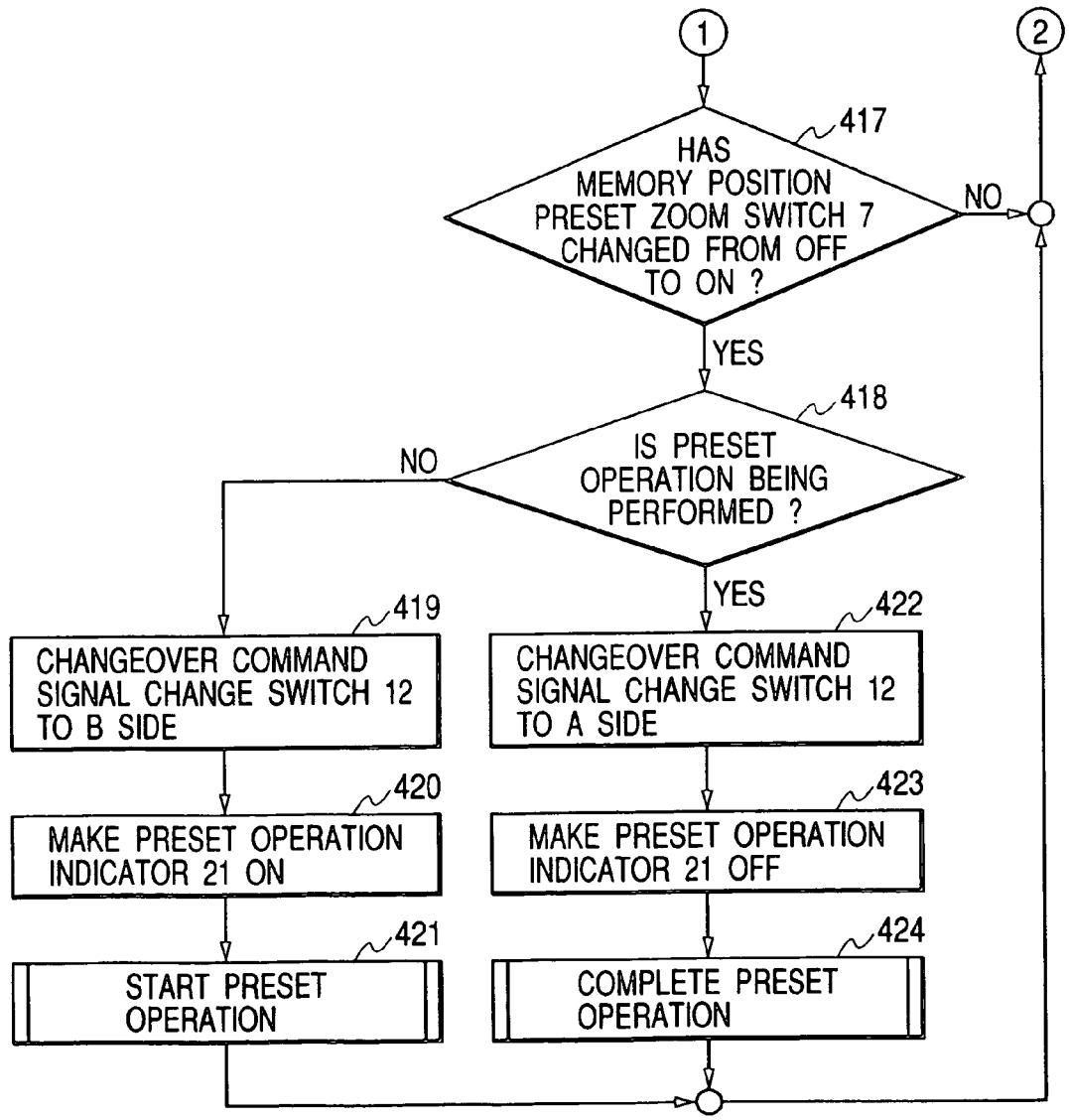

The process of the CPU 6 in the above-described sequence will be explained with reference to FIGS. 4A, 4B and 5. At first, there is discriminated whether the zoom control switch 1 is operated (step S401), and, if operated, the command signal selector switch 12 is shifted to the side A in order to control the zooming optical system 9 from the zoom control switch 1 (step S402).

Then there is discriminated whether the preset operation is executed (step S403), and, if not executed, the sequence returns to the discrimination whether the zoom control switch is operated (step S401).

In case the step S403 identifies that the preset operation is executed, the preset operation indicator 21 is turned off (step S404) and the preset operation is thereafter terminated (interrupted) (step S405). Then the sequence returns to the discrimination whether the zoom control switch is operated (step S401).

On the other hand, in case the step S401 identifies that the zoom control switch 1 is not operated, there is discriminated whether the preset operation is executed (step S406), and, if not, the sequence proceeds to a step S417.

In case the step S406 identifies that the preset operation is executed, the speed of the zooming optical system 9 is acquired from the A/D conversion circuit 17 (step S407), and the position of the zooming optical system 9 is acquired from the A/D conversion circuit 20 (step S408).

Then there is discriminated whether the zoom position acquired in the step S408 is equal to the preset position memorized in advance in the memory 6a by the flow shown in FIG. 2 (step S409), and, if equal, the command signal selecting switch 12 is shifted to the side A (step S410) and the preset operation indicator 21 is turned off (step S411) whereupon the preset operation is terminated (step S412).

In case the step S409 identifies that the zoom position is not equal to the preset position, there is discriminated whether the zoom speed acquired in the step S407 is equal to the preset speed memorized in advance in the memory 6a by the flow shown in FIG. 3 (more specifically whether the zoom speed is within a predetermined tolerance with respect to the preset speed) (step S413).

In case the zoom speed is not equal to the preset speed, there is discriminated whether the preset speed is larger than the zoom speed (step S414), and, if larger, the command signal output to the D/A conversion circuit 10 is increased (step S416). Also in case the preset speed is smaller than the zoom speed, the command signal output to the D/A conversion circuit 10 is decreased (step S415).

After the above-described processes, there is discriminated whether the preset memory position zoom switch 7 (represented as preset zoom switch in FIGS. 4A, 4B and 5) has been shifted from the off-state to the on-state (step S417), and, if not shifted, the sequence returns to the discrimination whether the zoom control switch 1 is operated (step S401).

On the other hand if the preset memory position zoom switch 7 has been shifted from the off-state to the on-state, there is discriminated whether the preset operation is executed (step S418), and, if not executed, the command signal selector switch 12 is shifted to the side B (step S419) and the preset operation indicator 21 is turned on (step S420). Then the preset operation is initiated with the preset speed memorized in the memory 6a by the flow shown in FIG. 3 (step S421).

Thereafter, when the zooming optical system 9 reaches the preset position (step S409), the command signal selector switch 12 is shifted to the side A (step S410) and the preset operation indicator 21 is turned off (step S411) whereupon the preset operation is terminated (step S412).

On the other hand, in case the step S418 identifies that the preset operation is executed, the command signal selector switch 12 is shifted to the side A (step S422) and the preset operation indicator 21 is turned off (step S423) whereupon the preset operation is terminated (interrupted) (step S424).

In the present embodiment, as explained in the foregoing, there is enabled a preset operation (preset memory position zoom control) of arbitrarily selecting the drive speed, for driving the zooming optical system 9 to the preset position, by the operation of the memory switch 8 as the preset speed to be memorized in the memory 6a. The function of such preset operation enables, without complicated speed setting operations, to achieve a change in the drive speed such as driving the zooming optical system 9 with a high speed for example during the ordinary zoom drive control and with a medium speed during the preset operation.

Besides, since the preset speed is set by detecting the actual drive speed of the zooming optical system 9, the preset speed can be set considerably low without affecting the operability of the zoom control switch 1.

Also in the present embodiment, the preset operation indicator is turned on in case of executing the preset operation, thereby enabling the operator to clearly recognize whether the preset operation is being executed even in the course of a preset operation at a low speed.

Second Embodiment

In the foregoing first embodiment, there has been explained the "preset memory position zoom control" of executing the preset operation with the preset speed to the preset position. It is however possible to realize a more effective preset function and to expand the range of the image taking techniques in television or video image taking, by adding a selection function for selecting whether the zooming optical system is driven, in the preset operation, with the preset speed or with the maximum speed drivable by the lens apparatus or the drive unit therefor.

FIG. 6 is a view showing the configuration of a lens apparatus of the present embodiment, wherein components equivalent to those in the first embodiment are represented by symbols same as those in the first embodiment.

In the present embodiment, the configuration of the first embodiment is additionally provided with a preset mode selector switch (speed selecting operation means) 22 for selecting the drive speed of the zooming optical system 9 during the preset operation either at the preset speed or at the maximum speed.

The preset memory position zoom switch 7, the memory switch 8 and the preset mode selector switch 22 may be provided integrally in the main body of the lens apparatus having the zooming optical system 9 and an unrepresented focusing optical system, or in a zoom demand (external control unit) which is connected to the main body of the lens apparatus for example through a cable and is provided for example with a thumb ring functioning in place for the zoom control switch 1.

Also the above-described components other than the zooming optical system 9, namely the zoom control switch 1, circuits such as the CPU 6, motor 14, speed detector 15, position detector 18, preset memory position zoom switch 7, memory switch 8 and preset mode selector switch 22, may be provided in a lens drive unit (optical apparatus driving unit) which is to be mounted on or connected to the main body of the lens apparatus of handy type, as shown in FIGS. 24 and 25.

In the lens apparatus or the lens drive unit of the above-described configuration, it is necessary to motor drive the zooming optical system 9 to the preset position as a preliminary operation for memorizing the preset position, or to motor drive in advance the zooming optical system 9 for memorizing the preset speed, as in the first embodiment.

Also the method of drive control for the zooming optical system from the zoom control switch 1, the method of detecting the position of the zooming optical system 9, required for memorizing the preset position, the method of detecting the drive speed of the zooming optical system 9, required for memorizing the preset speed, and the method of discriminating whether the zoom control switch 1 is operated, required for memorizing the preset speed, are same as those in the first embodiment.

In the following there will be explained the preset operation in the present embodiment. Also the control of the zooming optical system 9 in the preset operation of the present embodiment is similar to that of the first embodiment in that such control is executed by the supply of the command signal from the CPU 6 to the motor 14 through the D/A converting circuit 10, the CPU command signal calculation circuit 11, the side B of the command signal selector switch 12, and the power amplifying circuit 13, but is different in that a preset mode in which the CPU 6 outputs a command signal for driving the zooming optical system 6 with the preset speed or a maximum speed mode in which the CPU 6 outputs a command signal for driving with the maximum speed is selectively set according to the state of the preset mode selector switch 22. However, in either mode, the drive is executed to the preset position.

Figure 7B:
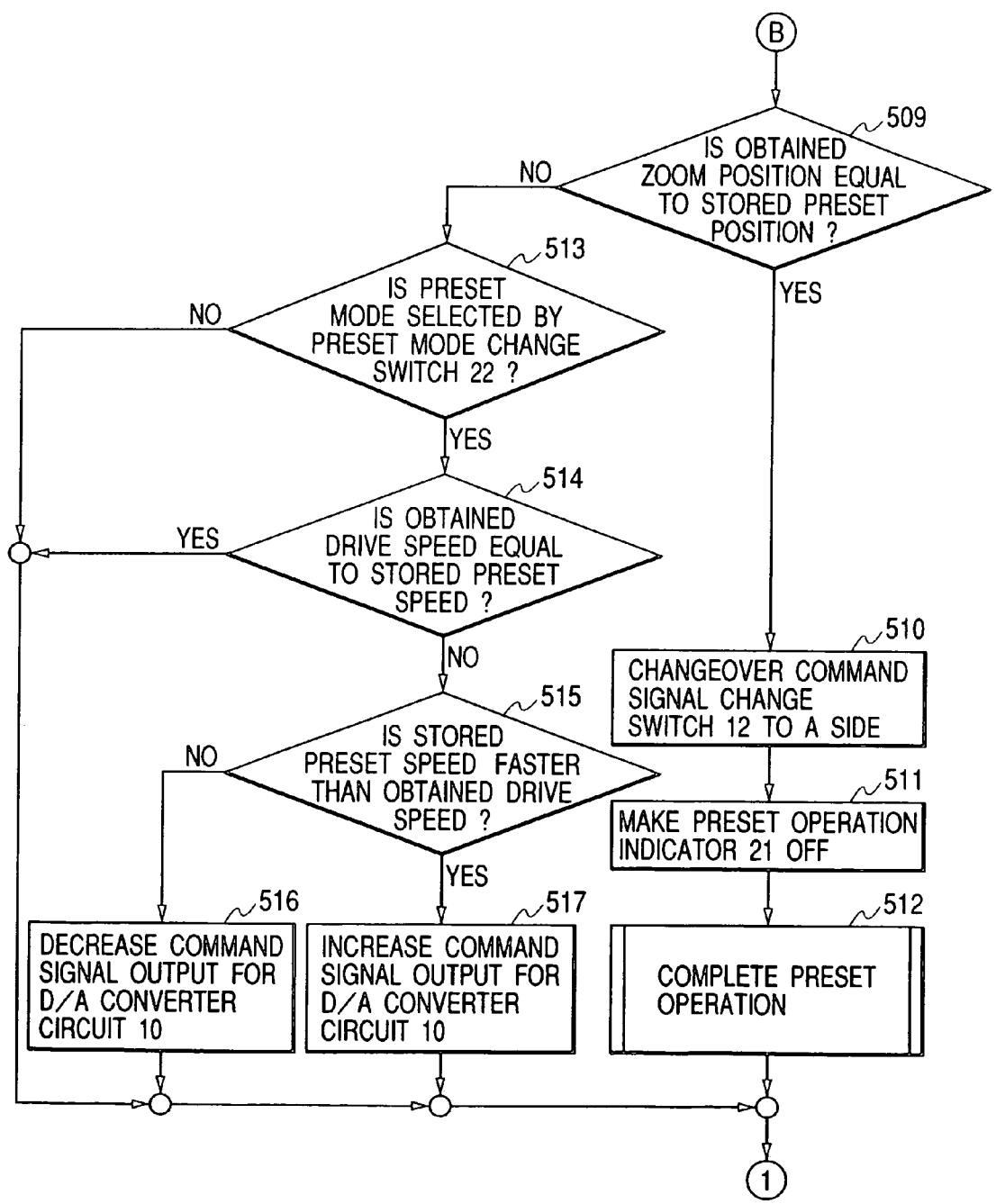
FIG. 7, which is comprised of FIGS. 7A and 7B, and FIG. 8 are process flow charts of the preset memory position zoom control in the second embodiment.
Figure 8:
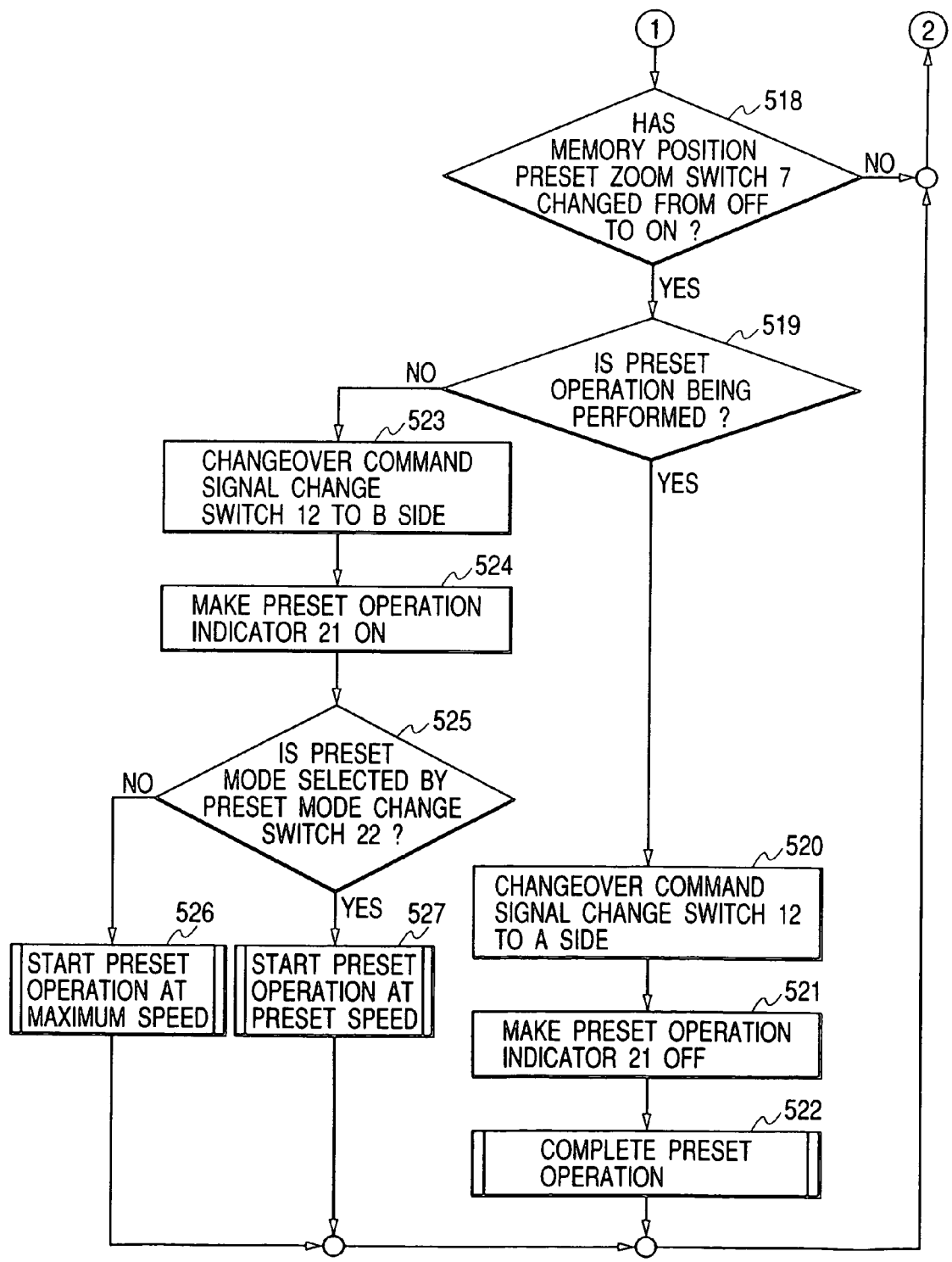

The process of the CPU 6 in the above-described sequence will be explained with reference to FIGS. 7A, 7B and 8. At first there is discriminated whether the zoom control switch 1 is operated (step S501), and, if operated, the command signal selector switch 12 is shifted to the side A in order to control the zooming optical system 9 from the zoom control switch 1 (step S502).

Then there is discriminated whether the preset operation is executed (step S503), and, if not executed, the sequence returns again to the discrimination whether the zoom control switch 1 is operated (step S501).

In case the step S503 identifies that the preset operation is executed, the preset operation indicator 21 is turned off (step S504) and the preset operation is thereafter terminated (interrupted) (step S505), whereupon the sequence returns to the discrimination whether the zoom control switch 1 is operated (step S501).

On the other hand if the step S501 identifies that the zoom control switch 1 is not operated, there is discriminated whether the preset operation is executed (step S506), and, if not executed, the sequence proceeds to a step S518.

In case the step S506 identifies that the preset operation is executed, the speed of the zooming optical system 9 is acquired from the A/D conversion circuit 17 (step S507), and then the position of the zooming optical system 9 is acquired from the A/D conversion circuit 20 (step S508).

Then there is discriminated whether the zoom position acquired in the step S508 is equal to the preset position memorized in advance in the memory 6a by the flow shown in FIG. 2 (step S509), and, if equal, the command signal selector switch 12 is shifted to the side A (step S510) and the preset operation indicator 21 is turned off (step S511), whereupon the preset operation is terminated (step S512).

In case the step S509 identifies that the zoom position is equal to the preset position, there is discriminated whether the preset mode selector switch 22 selects the preset mode (step S513).

In case the preset mode is selected, there is discriminated whether the zoom speed acquired in the step S607 is equal to the preset speed memorized in advance in the memory 6a by the flow shown in FIG. 3 and explained in the first embodiment (more specifically whether the zoom speed is within a predetermined tolerance with respect to the preset speed) (step S514).

In case the zoom speed is not equal to the preset speed, there is discriminated whether the preset speed is larger than the zoom speed (step S515), and, if larger, the command signal output to the D/A conversion circuit 10 is increased (step S517). Also in case the preset speed is smaller than the zoom speed, the command signal output to the D/A conversion circuit 10 is decreased (step S516).

In case the preset mode is not selected or in case the zoom speed is equal to the preset speed, the sequence proceeds to a step S518.

After the above-described processes, there is discriminated whether the preset memory position zoom switch 7 (represented as preset zoom switch in FIGS. 7A, 7B and 8) has been shifted from the off-state to the on-state (step S518), and, if not shifted, the sequence returns to the discrimination whether the zoom control switch 1 is operated (step S501).

On the other hand, if the preset memory position zoom switch 7 has been shifted from the off-state to the on-state, there is discriminated whether the preset operation is executed (step S519), and, if not executed, the command signal selector switch 12 is shifted to the side B (step S523) and the preset operation indicator 21 is turned on (step S524). Then there is discriminated whether the preset mode is selected by the preset mode selector switch 22 (step S525), and, if not selected, the preset operation is initiated with the drivable maximum speed (step S526). Also if the preset mode is not selected, the preset operation is initiated with the preset speed (step S527).

Thereafter, when the zooming optical system 9 reaches the preset position (step S509), the command signal selector switch 12 is shifted to the side A (step S510) and the preset operation indicator 21 is turned off (step S511) whereupon the preset operation is terminated (step S512).

On the other hand, in case the step S519 identifies that the preset operation is executed, the command signal selector switch 12 is shifted to the side A (step S520) and the preset operation indicator 21 is turned off (step S521) whereupon the preset operation is terminated (interrupted) (step S522).

In the present embodiment, as explained in the foregoing, the operator is rendered capable of arbitrarily selecting whether to execute the preset operation with the preset speed or with the maximum speed drivable in the lens apparatus or the like, in addition to the effects obtainable in the first embodiment, thereby realizing a more effective preset function and expanding the range of the image taking techniques in television or video image taking.

In the foregoing first and second embodiments there has been explained a case of obtaining the preset speed, to be used in the preset operation, from the actual drive speed of the zooming optical system 9, but the preset speed may also be obtained from a speed command signal corresponding to the operation of the zoom control switch 1.

Also in the foregoing first and second embodiments there has been explained a case of detecting the drive speed of the zooming optical system 9 from a speed signal outputted from the speed detector 15, but the drive speed may also be detected by acquiring the position signal outputted from the position detector at a constant interval.

Third Embodiment

In the foregoing first embodiment, there has been explained the "preset memory position zoom control" or the preset operation in which the preset speed to be used therein is obtained from the actual drive speed of the zooming optical system 9 and the actual drive speed of the zooming optical system 9 is increased or decreased so as to become equal to the preset speed, but it is also possible to achieve simpler control with a simpler circuit configuration, by obtaining the preset speed (command) from a speed command signal corresponding to the operation amount of the zoom control switch 1 and dispensing with the above-mentioned speed increasing/decreasing control. In this manner the speed detector 15, speed signal calculation circuit 16 and A/D conversion circuit 17 in the first embodiment can be dispensed with.

Figure 9:
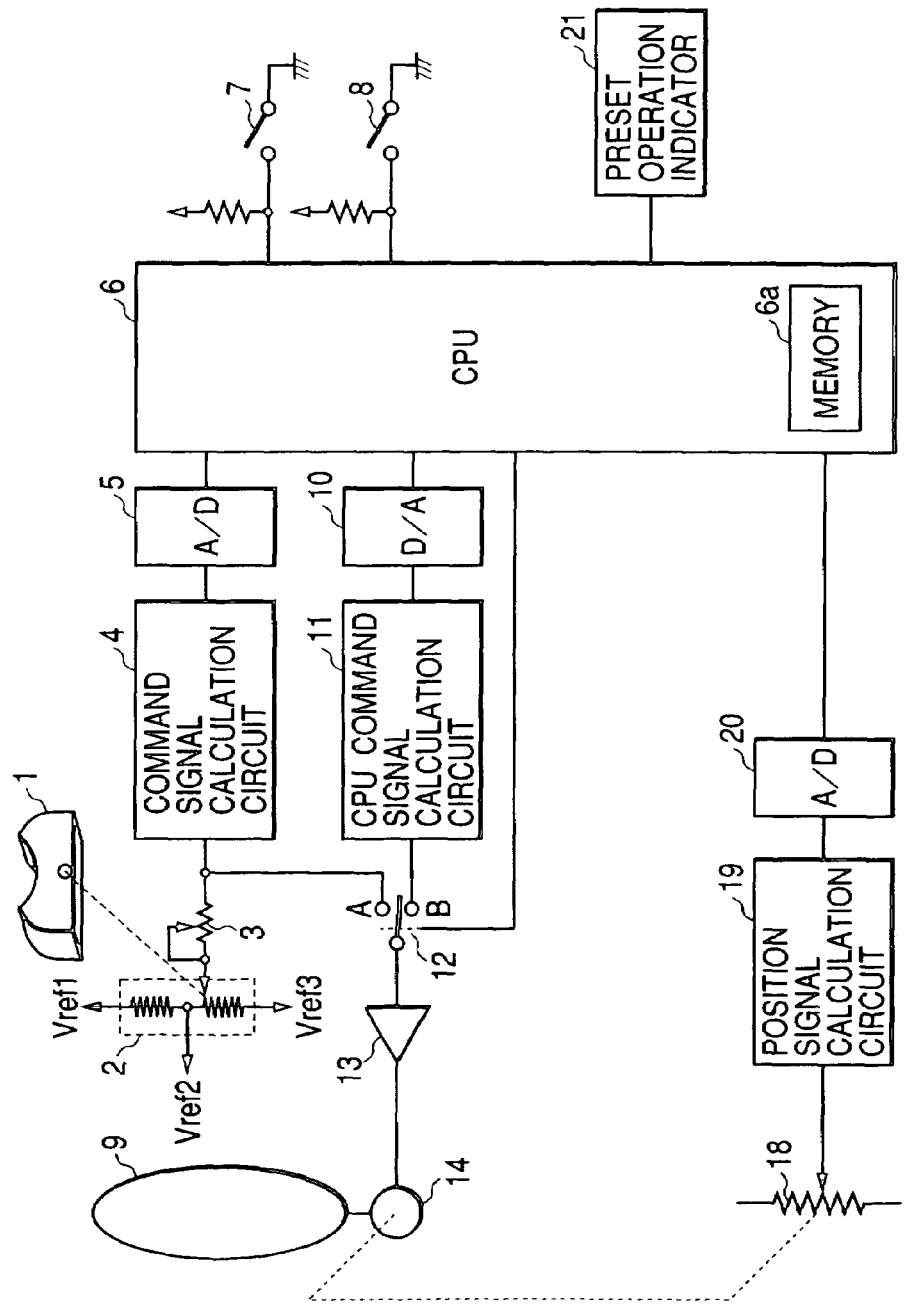
FIG. 9 is a view showing the configuration of a lens apparatus constituting a third embodiment of the present invention.

FIG. 9 shows the configuration of a lens apparatus of the present embodiment, wherein components equivalent to those in the first embodiment are represented by symbols same as those in the first embodiment.

The configuration of the present embodiment is composed by eliminating the speed detector 15, the speed signal calculation circuit 16 and the A/D conversion circuit 17 are eliminated from the configuration of the first embodiment.

The preset memory position zoom switch 7 and the memory switch 8 may be provided integrally in the main body of the lens apparatus having the zooming optical system 9 and an unrepresented focusing optical system, or in a zoom demand (external control unit) which is connected to the main body of the lens apparatus for example through a cable and is provided for example with a thumb ring functioning in place for the zoom control switch 1.

Also the above-described components other than the zooming optical system 9, namely the zoom control switch 1, circuits such as the CPU 6, motor 14, position detector 18, preset memory position zoom switch 7 and memory switch 8, may be provided in a lens drive unit (optical apparatus driving unit) which is to be mounted on or connected to the main body of the lens apparatus of handy type, as shown in FIGS. 24 and 25.

In the lens apparatus or the lens drive unit of the above-described configuration, it is necessary to motor drive the zooming optical system 9 to the preset position as a preliminary operation for memorizing the preset position, or to motor drive in advance the zoom control switch 1 for memorizing the preset speed.

Also the method of drive control for the zooming optical system 9 from the zoom control switch 1 and the method of detecting the position of the zooming optical system 9, required for memorizing the preset position are same as those in the first embodiment.

Also the detection, required in memorizing the preset speed, of the speed command signal outputted from the command signal generation circuit 2 according to the operation amount of the zoom control switch 1 can be achieved by the supply of the speed command signal to the CPU 6 through the zoom speed controlling variable resistor 3, command signal calculation circuit 4 and A/D conversion circuit 5. Also there can be similarly discriminated whether the zoom control switch 1 is operated.

Figure 10:
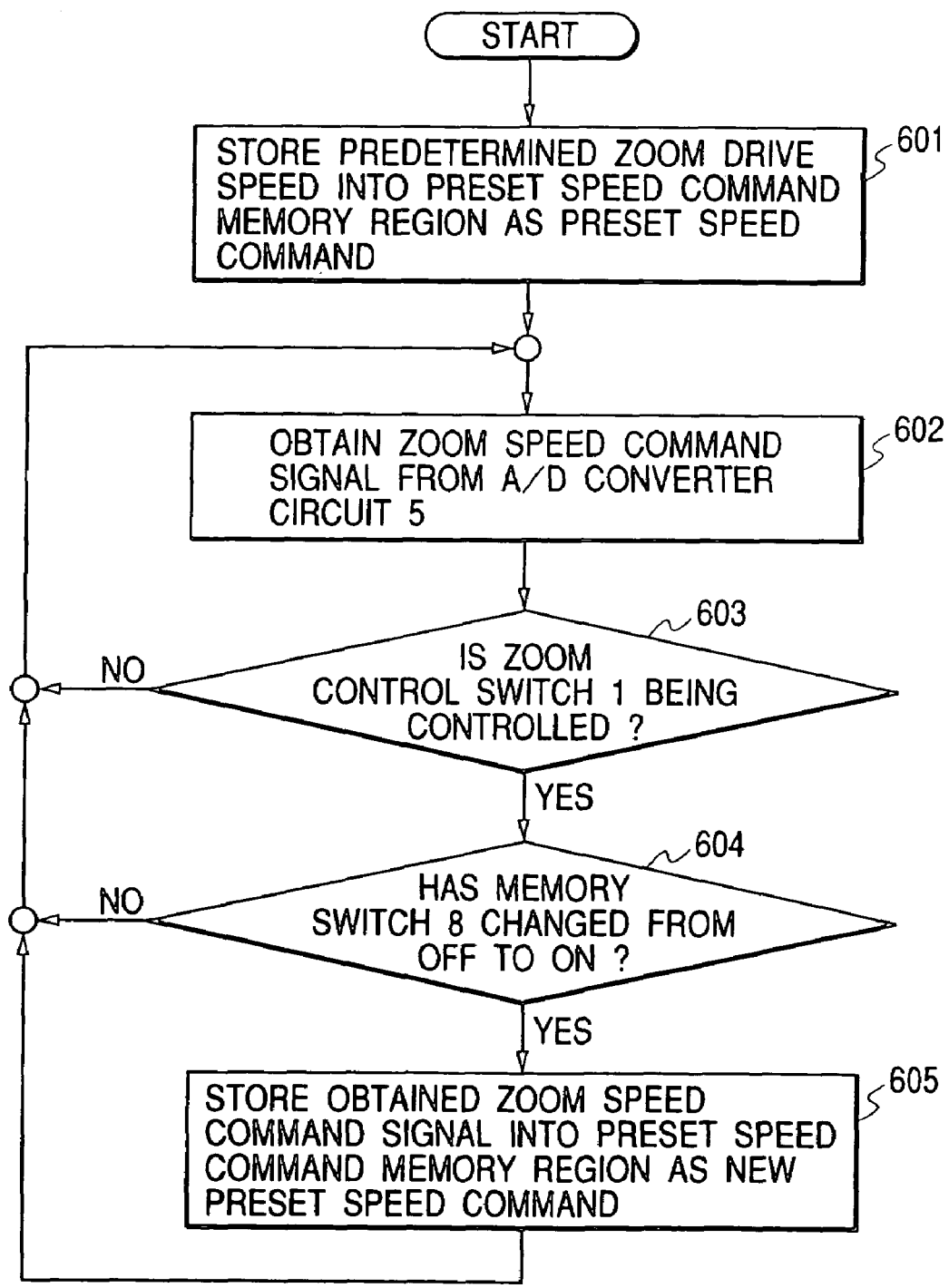
FIG. 10 is a memory setting flow chart for a preset speed to be employed in the preset memory position zoom control in the lens apparatus of the third embodiment.

The memory setting sequence (process of the CPU 6) for the preset speed in the present embodiment will be explained with reference to FIG. 10. At first, as an initialization, a predetermined zoom driving speed, such as the maximum speed, is memorized as a preset speed command in a preset speed command memory area provided in the memory 6*a* (step S601).

Then the speed command signal is acquired from the A/D conversion circuit 5 (step S602). Then there is discriminated whether the zoom control switch 1 is operated (step S603), and, if not operated, the speed command signal is acquired again from the A/D conversion circuit 5 (step S602).

In case the zoom control switch 1 is operated, there is discriminated whether the memory switch 8 has been shifted from the off-state to the on-state (step S604), and, if not shifted, the sequence returns to the step S602.

In case the memory switch 8 has been shifted from the off-state to the on-state, the speed command signal acquired in the step S602 is memorized as a new preset speed command in the preset speed command memory area (step S605).

In the following there will be explained the preset operation in the present embodiment. Also in the preset operation of the present embodiment, the zooming optical system 9 is controlled by the supply of the command signal from the CPU 6 to the motor 14 through the D/A conversion circuit 10, the CPU command signal calculation circuit 11, the side B of the command signal selector switch 12 and the power amplifying circuit 13, whereby the zooming optical system 9 is driven to the preset position with the speed corresponding to the preset speed command.

Figure 11:
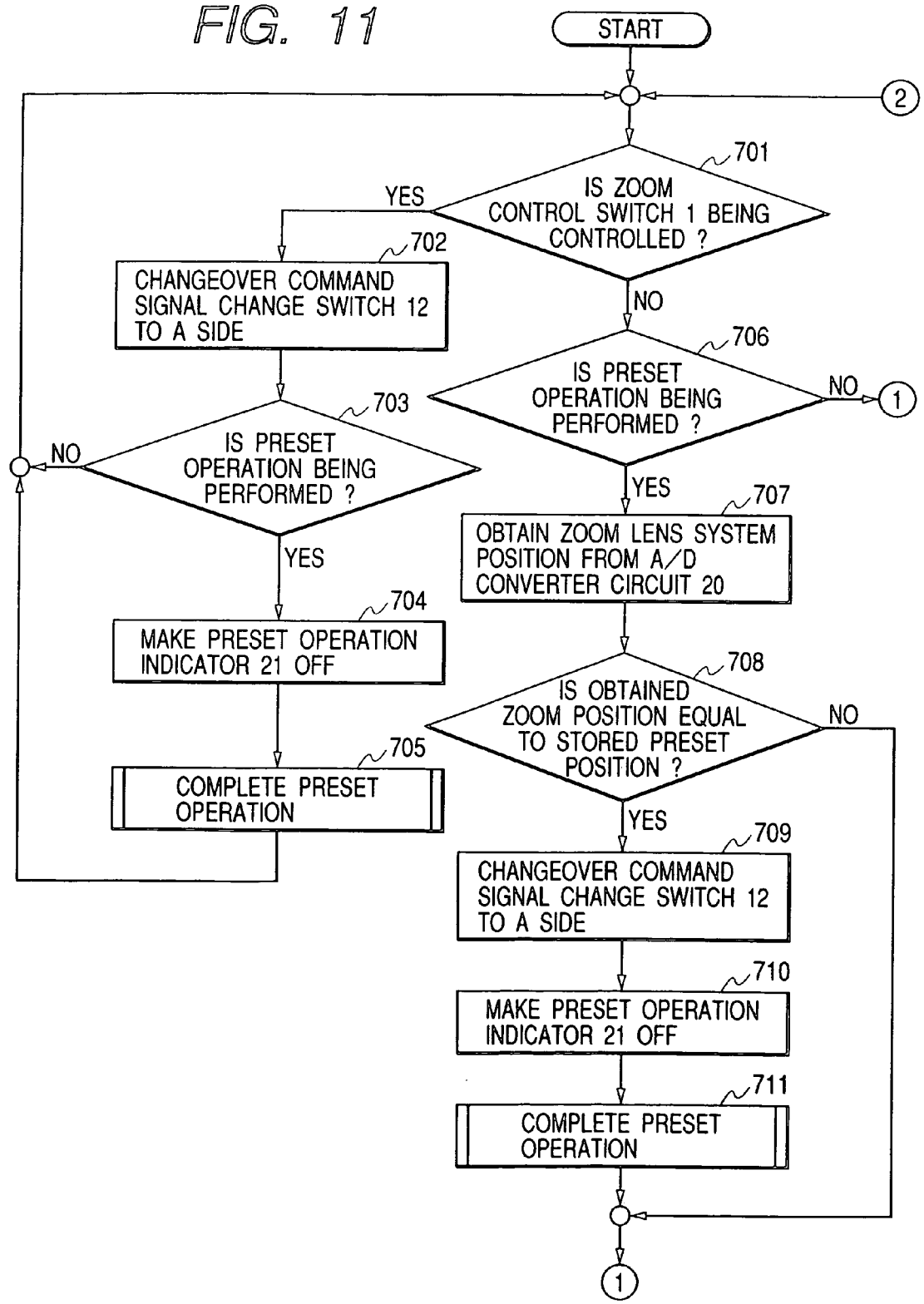
FIGS. 11 and 12 are process flow charts in the preset memory position zoom control in the lens apparatus of the third embodiment.
Figure 12:
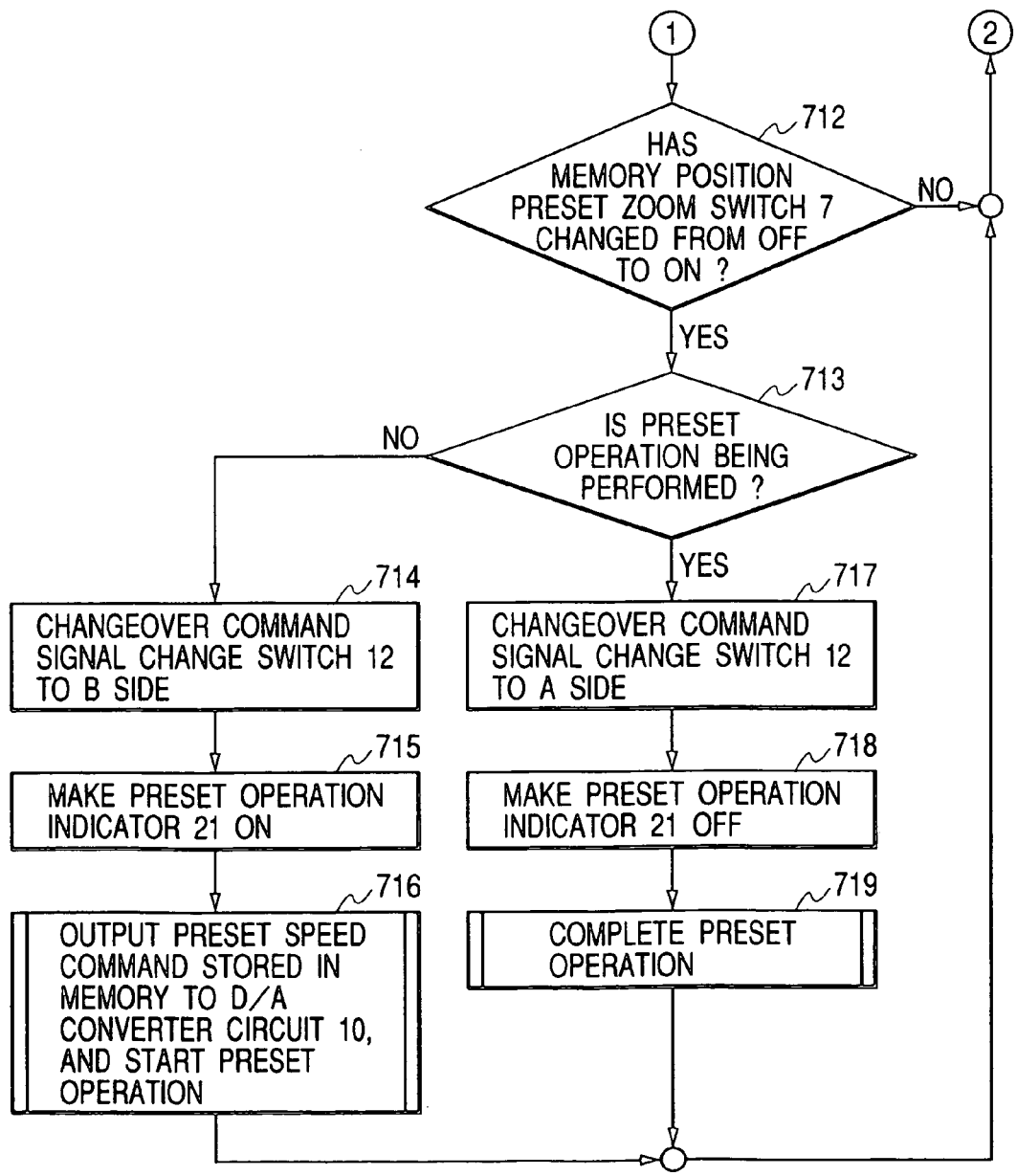

The process of the CPU 6 in the above-described preset operation will be explained with reference to FIGS. 11 and 12. At first, there is discriminated whether the zoom control switch 1 is operated (step S701), and, if operated, the command signal selector switch 12 is shifted to the side A in order to control the zooming optical system 9 from the zoom control switch 1 (step S702). Then there is discriminated whether the preset operation is executed (step S703), and, if not executed, the sequence returns to the discrimination whether the zoom control switch is operated (step S701).

In case the step S703 identifies that the preset operation is executed, the preset operation indicator 21 is turned off (step S704) and the preset operation is thereafter terminated (interrupted) (step S705). Then the sequence returns to the discrimination whether the zoom control switch is operated (step S701).

On the other hand, in case the step S701 identifies that the zoom control switch 1 is not operated, there is discriminated whether the preset operation is executed (step S706), and, if not, the sequence proceeds to a step S712.

In case the step S706 identifies that the preset operation is executed, the position of the zooming optical system 9 is acquired from the A/D conversion circuit 20 (step S707).

Then there is discriminated whether the zoom position acquired in the step S707 is equal to the preset position memorized in advance by the flow shown in FIG. 2 (step S708), and, if equal, the command signal selecting switch 12 is shifted to the side A (step S709) and the preset operation indicator 21 is turned off (step S710) whereupon the preset operation is terminated (step S711).

In case the zoom position is not equal to the preset position, the sequence proceeds to a step S712.

After the above-described processes, there is discriminated whether the preset memory position zoom switch 7 has been shifted from the off-state to the on-state (step S712), and, if not shifted, the sequence returns to the discrimination whether the zoom control switch 1 is operated (step S701).

On the other hand, if the preset memory position zoom switch 7 has been shifted from the off-state to the on-state, there is discriminated whether the preset operation is executed (step S713), and, if not executed, the command signal selector switch 12 is shifted to the side B (step S714) and the preset operation indicator 21 is turned on (step S715). Then the preset speed command memorized in advance by the flow shown in FIG. 8 is outputted to the D/A conversion circuit 10, and the preset operation is initiated with a speed corresponding to the preset speed command (step S716).

Thereafter, when the zooming optical system 9 reaches the preset position (step S708), the command signal selector switch 12 is shifted to the side A (step S709) and the preset operation indicator 21 is turned off (step S710) whereupon the preset operation is terminated (step S711).

On the other hand, in case the step S713 identifies that the preset operation is executed, the command signal selector switch 12 is shifted to the side A (step S717) and the preset operation indicator 21 is turned off (step S718) whereupon the preset operation is terminated (interrupted) (step S719).

In the present embodiment, as explained in the foregoing, there is enabled a preset operation (preset memory position zoom control) of arbitrarily selecting the drive speed, for driving the zooming optical system 9 to the preset position, by the operation of the memory switch 8 as the preset speed to be memorized in the memory 6a. The function of such preset operation enables, without complicated speed setting operations, to achieve a change in the drive speed such as driving the zooming optical system 9 with a high speed for example during the ordinary zoom drive control and with a medium speed during the preset operation.

Besides, since the preset speed is set by detecting the speed command signal generated corresponding to the operation of the zoom control switch 1, the preset speed can be set considerably low without affecting the operability of the zoom control switch 1.

Also in the present embodiment, the preset operation indicator 21 is turned on in case of executing the preset operation, thereby enabling the operator to clearly recognize whether the preset operation is being executed even in the course of a preset operation at a low speed.

In the foregoing first to third embodiments there has been explained a case of memorizing the preset speed after discriminating that the zoom control switch 1 is operated, but it is also possible to execute the memory of the preset speed upon discrimination of the zooming optical system 9 for example through a change in the position signal released from the position detector.

Also in the foregoing embodiments, the preset position is memorized by shifting the preset memory position switch 7 from the off-state to the on-state while the memory switch 8 is turned on, but it is also possible to memorize the preset position when the memory switch 8 and the preset memory position switch 7 are simultaneously turned on.

Also in the foregoing first to third embodiments, there has been explained a case where the memory switch 8 is composed of a single switch, but it is also possible to utilize the two memory switches constructed as a single set for avoiding erroneous operation and to memorize the preset information in response to the operation of such memory switches.

Also in the foregoing first to third embodiments, there has been explained a case of executing the preset drive control relating to the zooming optical system, but the present invention is likewise applicable to the preset drive control of optical adjustment means other than the zooming optical system, such as a focusing optical system or an iris.

Fourth Embodiment

Figure 13:
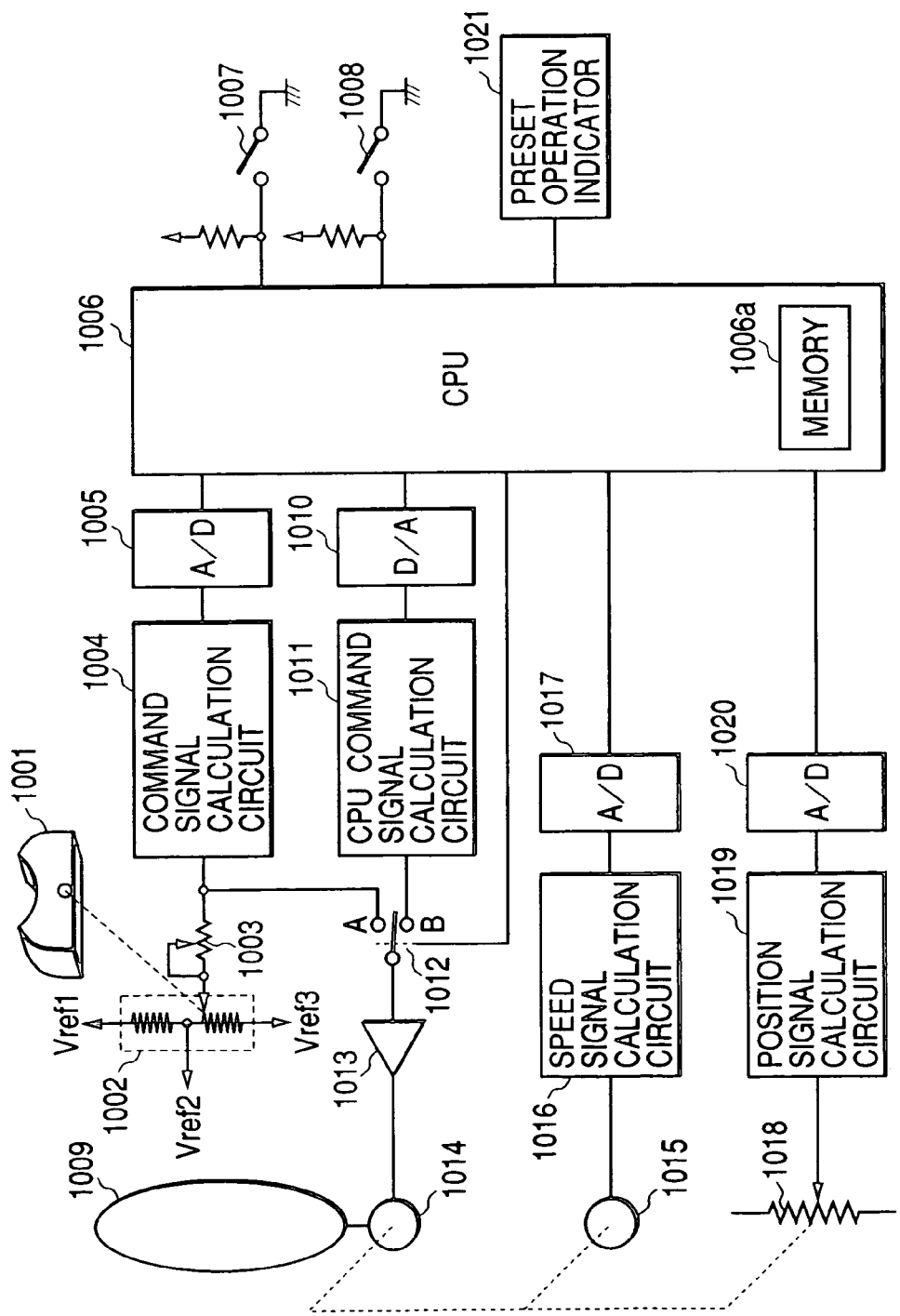
FIG. 13 is a view showing the configuration of a lens apparatus constituting a fourth embodiment of the present invention.

FIG. 13 shows the configuration of a lens apparatus (optical apparatus) constituting a fourth embodiment of the present invention.

Referring to FIG. 13, a zoom control switch (instructing operation means) 1001 is to be operated by the photographer or operator. A command signal generation circuit 1002 generates a command signal for instructing a drive direction and a drive speed (which may also be a drive amount or a drive position) corresponding to the operation amount of the zoom control switch 1 in order to electrically drive a zooming optical system (optical adjustment means) 1009 for executing the zooming adjustment of the lens apparatus.

A zoom speed controlling variable resistor 1003 changes the drive speed of the zooming optical system 1009 in relation to the operation amount of the zoom control switch 1001. A command signal calculation circuit 1004 executes signal level shifting on the command signal for fetching in an A/D conversion circuit 1005. An A/D conversion circuit 1005 converts the analog signal outputted from the command signal calculation circuit 1004 into a digital signal.

A CPU 1006 controls the functions of the present lens apparatus and is provided therein with a memory (memory means) 1006a capable of memorizing a preset speed (preset speed information) and a preset direction (preset direction information). The CPU 1006 also executes "preset speed zoom control (speed/direction drive control)" for executing drive in the preset direction memorized in the memory 1006a with the memorized preset speed.

A memory switch (memory instructing operation means) 1008 is used for providing the CPU 1006 with an instruction for memory of the preset speed and the preset direction to be employed in the "preset speed zoom control".

A preset speed zoom switch (control starting operation means) 1007 has a memorizing function for causing the memory 1006a to memorize the preset speed and the preset direction upon being turned on while the zooming optical system 1009 is driven, and a function of instructing the start (and interruption) of the control operation upon being turned on after the memory of the preset speed and the preset direction.

There are also provided a D/A converting circuit 1010 for converting the digital command signal, outputted from the CPU 1006 for driving the zooming optical system 1009 into an analog signal; a CPU command signal calculation circuit 1011 for shifting the signal level of the command signal outputted from the D/A converting circuit 1010; and a command signal selector switch 1012 for selecting whether the zooming optical system 1009 is driven by the zoom control switch 1001 or by the CPU 1006.

There are also provided a power amplifier circuit 1013 for activating a motor 1014 for driving the zooming optical system 1009; a speed detector 1015 for outputting a speed signal corresponding to the drive speed of the zooming optical system 1009; a speed signal calculation circuit 1016 for shifting the signal level of the speed signal for fetching into an A/D conversion circuit 1017; and an A/D conversion circuit 1017 for converting the analog signal, outputted from the speed signal calculation circuit 1016, into a digital signal.

There are also provided a position signal detector (position detection means) 1018 for outputting a position signal corresponding to the position of the zooming optical system 1009; a position signal calculation circuit 1019 for shifting the signal level of the position signal for fetching into an A/D conversion circuit 1020; and an A/D conversion circuit 1020 for converting the analog signal, outputted from the position signal calculation circuit 1019, into a digital signal.

A preset operation indicator 1021 provides visual indication whether the "preset speed zoom control" is executed.

The preset speed zoom switch 1007 and the memory switch 1008 may be provided integrally in the main body of the lens apparatus having the zooming optical system 1009 and an unrepresented focusing optical system, or in a zoom demand (external control unit) which is connected to the main body of the lens apparatus for example through a cable and is provided for example with a thumb ring functioning in place for the zoom control switch 1001.

Also the above-described components other than the zooming optical system 1009, namely the zoom control switch 1001, circuits such as the CPU 1006, motor 1014, speed detector 1015, position detector 1018, preset speed zoom switch 1007 and memory switch 1008, may be provided in a lens drive unit (optical apparatus driving unit) which is to be mounted on or connected to the main body of the lens apparatus of handy type.

In the lens apparatus or the lens drive unit of the above-described configuration, it is necessary to motor drive the zooming optical system 1009 in advance, in order to memorize the preset speed and the preset direction.

In the following there will be explained the drive control for the zooming optical system 1009 from the zoom control switch 1001. When the zoom control switch 1001 is operated, the command signal generation circuit 1002 generates a command signal for instructing the drive direction and the drive speed (which may also be drive amount or drive position), corresponding to the operation amount of the switch. The command signal is entered into the power amplifying circuit 1013 through the zoom speed controlling variable resistor 1003, which varies the drive speed of the zooming optical system 1009 according to the operation amount of the zoom control switch 1001, and the side A of the command signal selector switch 1012, and is then entered into the motor 1014 after amplification to a predetermined level by the power amplifying circuit 1013, whereby the motor 1014 is activated to drive the zooming optical system 1009.

The actual drive speed and the actual drive direction of the zooming optical system 1009, required for memorizing the preset speed and the preset direction, can be detected by the entry of the output of the speed detector 1013 into the CPU 1006 through the speed signal calculation circuit 1016 and the A/D conversion circuit 1017.

Also the discrimination whether the zoom control switch 1001 is operated, required in memorizing the preset speed and the preset direction, can be achieved by the entry of the output of the command signal generation circuit 1002, corresponding to the operation amount of the zoom control switch 1001, into the CPU 1006 through the zoom speed controlling variable resistor 1003, the command signal calculation circuit 1004 and the A/D conversion circuit 1005.

Also the actual drive position of the zooming optical system 1009 can be detected by the entry of the output of the position detector 1018 into the CPU 1006 through the position signal calculation circuit 1019 and the A/D conversion circuit 1020.

In the following there will be explained a memory setting sequence for the preset speed and the preset direction, required in executing the "preset speed zoom control".

In this memory setting sequence, the operator in advance moves the zooming optical system 1009 with a speed desired for presetting and a direction desired for presetting by operating the zoom control switch 1001, and, in such state, shifts the memory switch 1008 from the off-state to the on-state, whereby the CPU 1006 memorizes, as the preset speed and the preset direction, the drive speed and drive direction of the zooming optical system 1009 (actual drive speed and actual drive direction detected through the speed detector 1015) when the memory switch 1008 is shifted from the off-state to the on-state.

The process of the CPU 1006 in the above-described sequence will be explained with reference to FIG. 14. At fist, as an initialization, a predetermined zoom drive speed, such as the maximum speed, is memorized as a preset speed in a preset speed memory area provided in the memory 1006*a* (step S1101). The preset speed in such initialization may be the zoom drive speed desired by the operator, or a zoom drive speed selected while the lens apparatus is powered previous time.

Also as an initialization, a predetermined zoom drive direction, such as the telephoto side or wide angle side, is memorized as a preset direction in a preset direction memory area provided in the memory 1006*a* (step S1102).

The preset direction in such initialization may be the zoom drive direction desired by the operator, or a zoom drive direction selected while the lens apparatus is powered previous time.

Then the drive speed and drive direction of the zooming optical system 1009 are acquired from the A/D conversion circuit 1017 (step S1103). Then there is discriminated whether the zoom control switch 1001 is operated by acquiring the data of the A/D conversion circuit 1005 (step S1104), and, if not operated, the zoom speed and the zoom direction are acquired again from the A/D conversion circuit 1017 (step S1103).

If the zoom control switch 1001 is turned on, there is discriminated whether the memory switch 1008 has been shifted from the off-state to the on-state (step S1105), and, if not shifted, the sequence returns to the step S1103.

If the memory switch 1008 has been shifted from the off-state to the on-state, the drive speed acquired in the step S1103 is memorized as a new preset speed in the preset speed memory area (step S1106). Also the drive direction acquired in the step S1103 is memorized as a new preset direction in the preset direction memory area (step S1107).

In the following there will be explained the operation of the "preset speed zoom control" (hereinafter simply called "preset operation"). In such preset operation, the zooming optical system 1009 is controlled by the entry of the command signal from the CPU 1006 into the motor 1014 through the D/A conversion circuit 1010, the CPU command signal calculation circuit 1011, the side B of the command signal selector switch 1012 and the power amplifying circuit 1013, whereby the zooming optical system 1009 is driven in the preset direction and with the preset speed to an end of the movable range of the zooming optical system 1009 (or to a position of interruption in case the preset speed zoom control is interrupted).

Figure 15B:
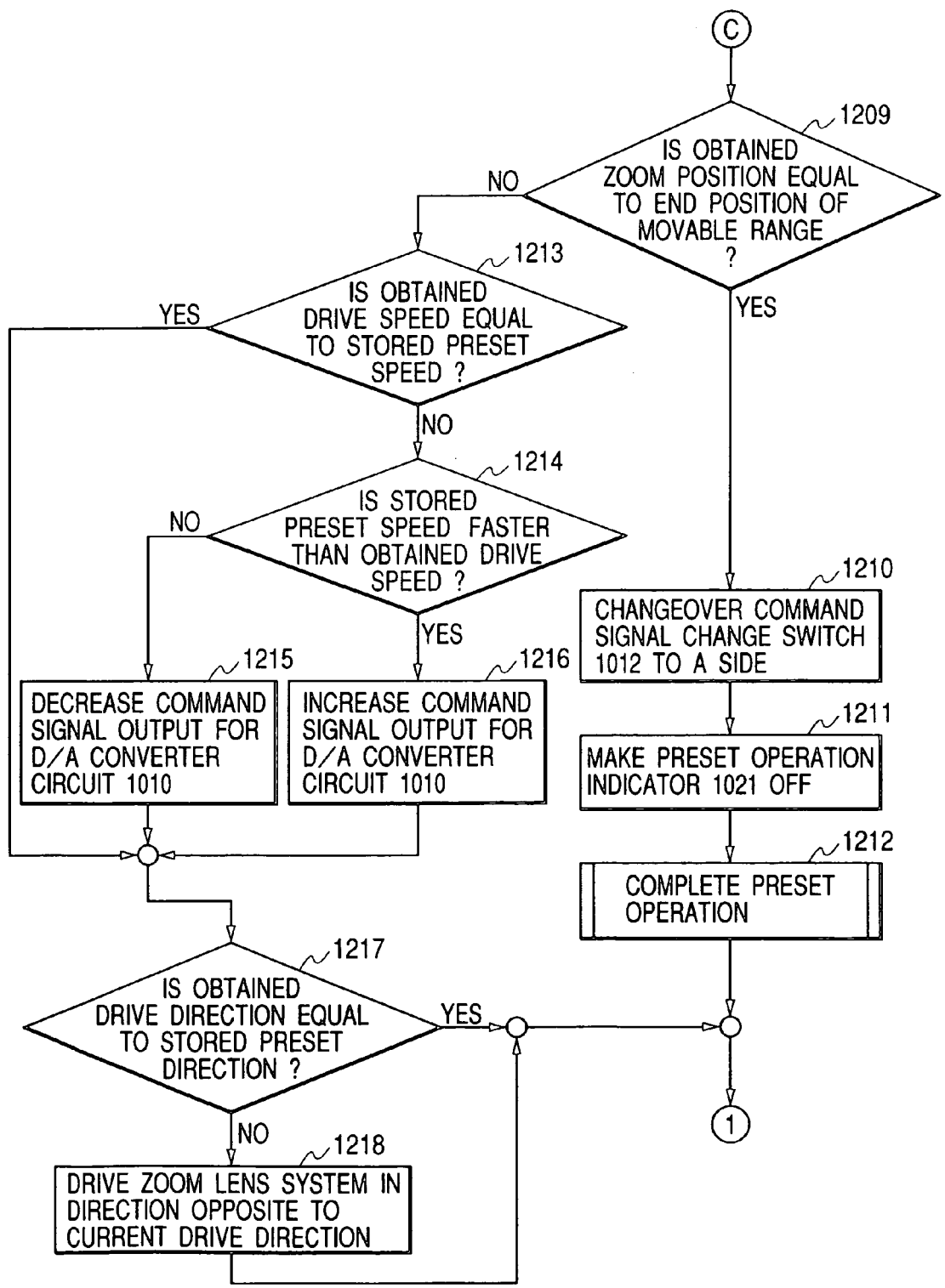
FIG. 15, which is comprised of FIGS. 15A and 15B, and FIG. 16 are process flow charts in the preset speed zoom control in the above-mentioned lens apparatus.
Figure 16:
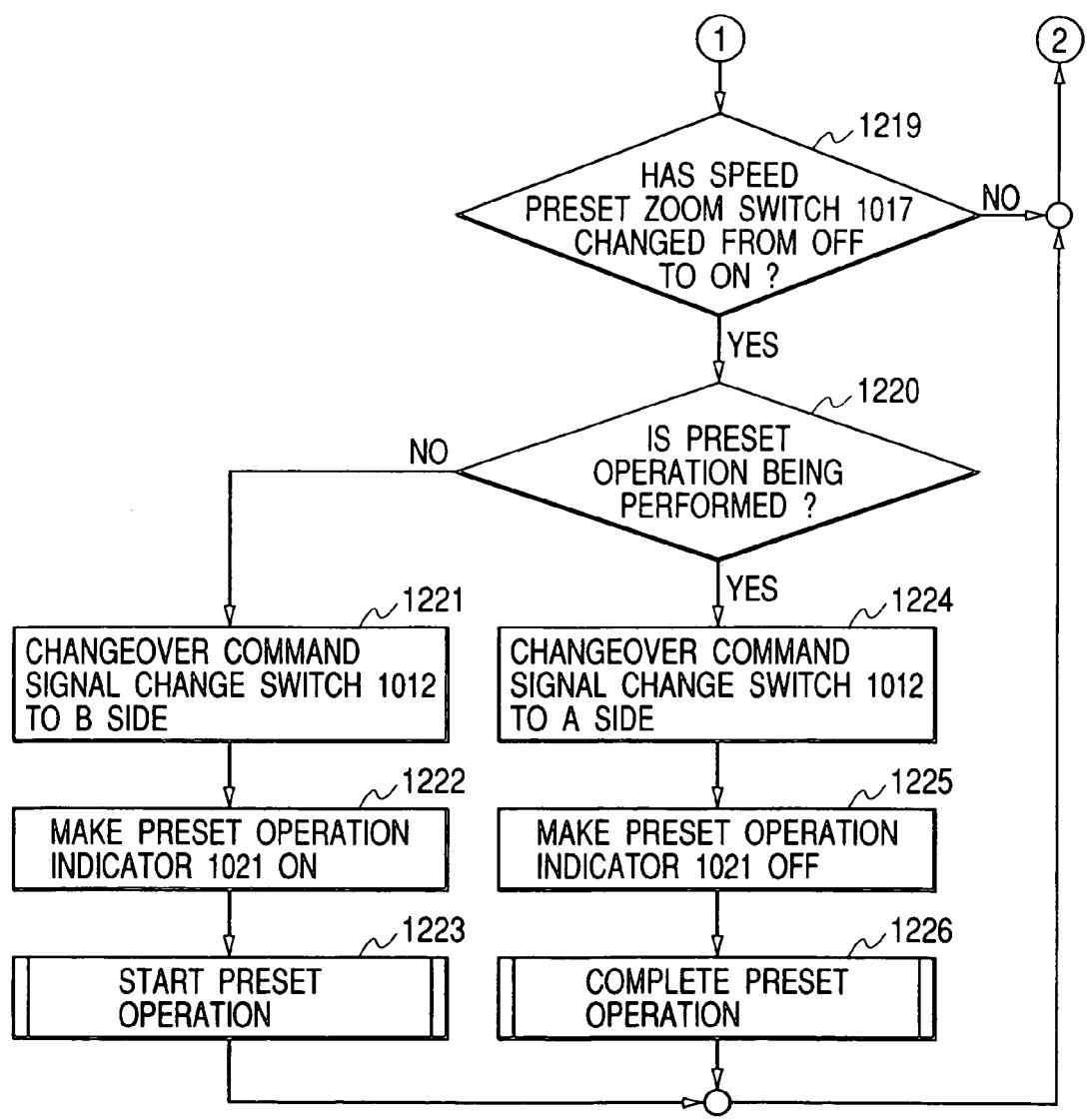

The process of the CPU 1006 in the above-described sequence will be explained with reference to FIGS. 15A, 15B and 16. At first, there is discriminated whether the zoom control switch 1001 is operated (step S1201), and, if operated, the command signal selector switch 1012 is shifted to the side A in order to control the zooming optical system 1009 from the zoom control switch 1001 (step S1202).

Then there is discriminated whether the preset operation is executed (step S1203), and, if not executed, the sequence returns to the discrimination whether the zoom control switch 1001 is operated (step S1201).

In case the step S1203 identifies that the preset operation is executed, the preset operation indicator 1021 is turned off (step S1204) and the preset operation is thereafter terminated (interrupted) (step S1205). Then the sequence returns to the discrimination whether the zoom control switch is operated (step S1201).

On the other hand, in case the step S1201 identifies that the zoom control switch 1001 is not operated, there is discriminated whether the preset operation is executed (step S1206), and, if not, the sequence proceeds to a step S1219.

In case the step S1206 identifies that the preset operation is executed, the speed and direction of the zooming optical system 1009 are acquired from the A/D conversion circuit 1017 (step S1207), and the position of the zooming optical system 1009 is acquired from the A/D conversion circuit 1020 (step S1208).

Then there is discriminated whether the zoom position acquired in the step S1208 has reached the end of the movable range in the lens apparatus (step S1209), and, if the zoom position has reached the end of the movable range, the command signal selector switch 1012 is shifted to the side A (step S1210) and the preset operation indicator 1021 is turned off (step S1211) whereupon the preset operation is terminated (step S1212).

Figure 14:
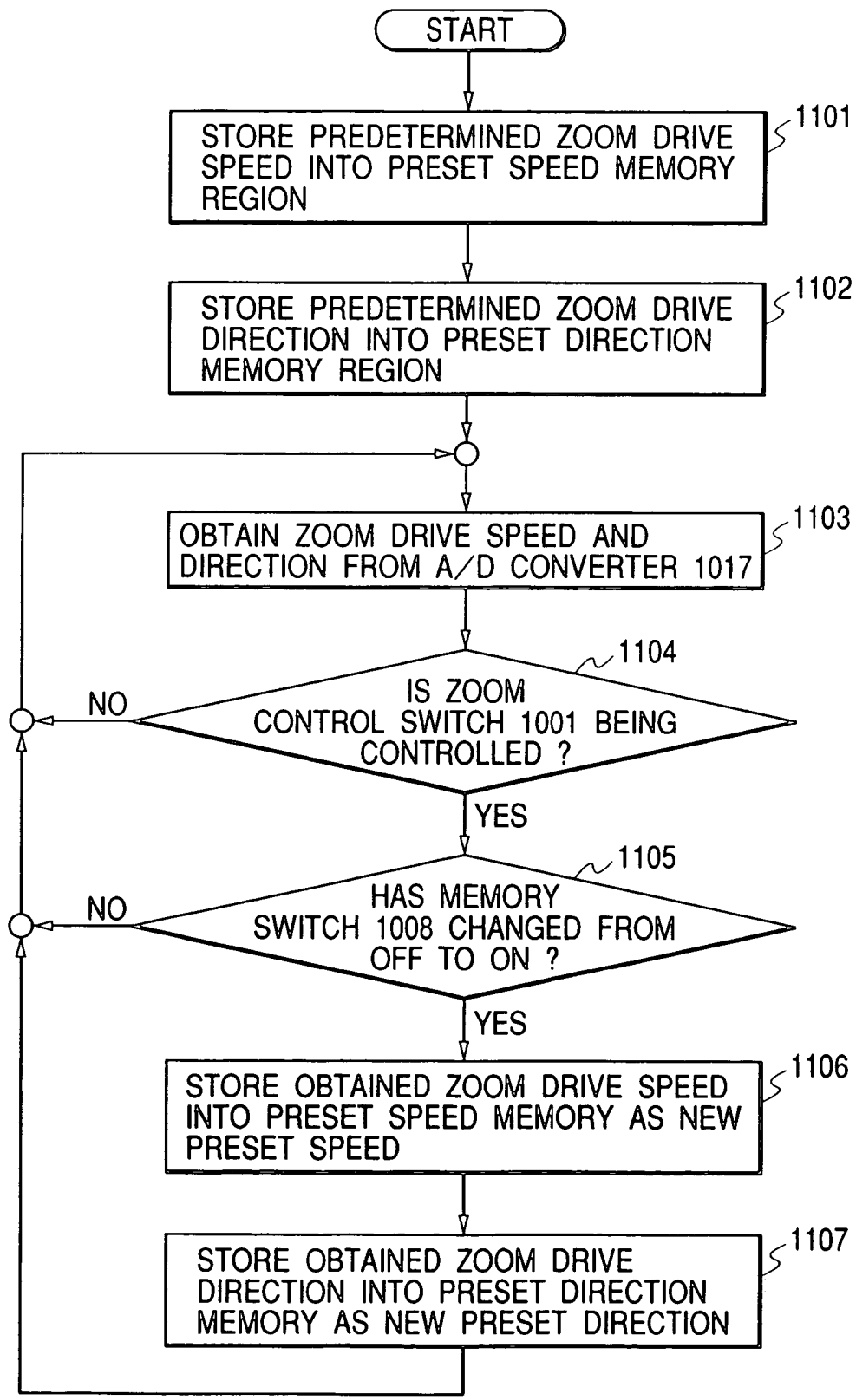
FIG. 14 is a memory setting flow chart for a preset speed and a preset direction to be employed in the preset memory position zoom control in the above-mentioned lens apparatus.

In case the step S1209 identifies that the zoom position has not reached the end of the movable range, there is discriminated whether the zoom speed acquired in the step S1207 is equal to the preset speed memorized in advance in the memory 1006a by the flow shown in FIG. 14 (more specifically whether the zoom speed is within a predetermined tolerance with respect to the preset speed) (step S1213).

In case the zoom speed is not equal to the preset speed, there is discriminated whether the preset speed is larger than the zoom speed (step S1214), and, if larger, the command signal output to the D/A conversion circuit 10101 is increased (step S1216). Also in case the preset speed is smaller than the zoom speed, the command signal output to the D/A conversion circuit 1010 is decreased (step S1215).

Then there is discriminated whether the zoom direction acquired in the step S1207 is equal to the preset direction memorized in advance (step S1217), and, if not equal, the zooming optical system 1009 is driven in a direction opposite to the current zoom direction (step S1218).

After the above-described processes, there is discriminated whether the preset speed zoom switch 1007 (represented as preset zoom switch 1007 in FIGS. 15A, 15B and 16) has been shifted from the off-state to the on-state (step S1219), and, if not shifted, the sequence returns to the discrimination whether the zoom control switch 1001 is operated (step S1201).

On the other hand, if the preset speed zoom switch 1007 has been shifted from the off-state to the on-state, there is discriminated whether the preset operation is executed (step S1220), and, if not executed, the command signal selector switch 1012 is shifted to the side B (step S1221) and the preset operation indicator 1021 is turned on (step S1222). Then the preset operation is initiated in the preset direction and with the preset speed memorized in the memory 6a by the flow shown in FIG. 14 (step S1223).

Thereafter, when the zooming optical system 1009 reaches the end of the movable range (step S1209), the command signal selector switch 1012 is shifted to the side A (step S1210) and the preset operation indicator 1021 is turned off (step S1211) whereupon the preset operation is terminated (step S1212).

On the other hand, in case the step S1220 identifies that the preset operation is executed, the command signal selector switch 1012 is shifted to the side A (step S1224) and the preset operation indicator 1021 is turned off (step S1225) whereupon the preset operation is terminated (interrupted) (step S1226).

In the present embodiment, as explained in the foregoing, there is enabled a preset operation of driving the zooming optical system 1009 in the direction and with the speed which are arbitrary selected by the operator in advance for example by the operation of the memory switch 1008 and memorized in the memory 1006a, whereby the zooming optical system 1009 can be driven with a constant speed by an extremely simple operation. Also the constant speed drive of the zooming optical system 1009 can be exactly reproduced with a same speed, by merely turning on the preset speed zoom switch 1007.

Also in the present embodiment, the preset operation indicator 1021 is turned on in case of executing the preset operation, thereby enabling the operator to clearly recognize whether the preset operation is being executed even in the course of a preset operation at a low speed.

Fifth Embodiment

In the foregoing fourth embodiment, there has been explained the "preset speed zoom control" of executing the preset operation with the preset speed and in the preset direction. It is however possible to realize a more effective preset function and to expand the range of the image taking techniques in television or video image taking, by adding a selection function for selecting whether the zooming optical system 1009 is driven, in the preset operation, with the preset speed or with the maximum speed drivable by the lens apparatus or the drive unit therefor.

Figure 17:
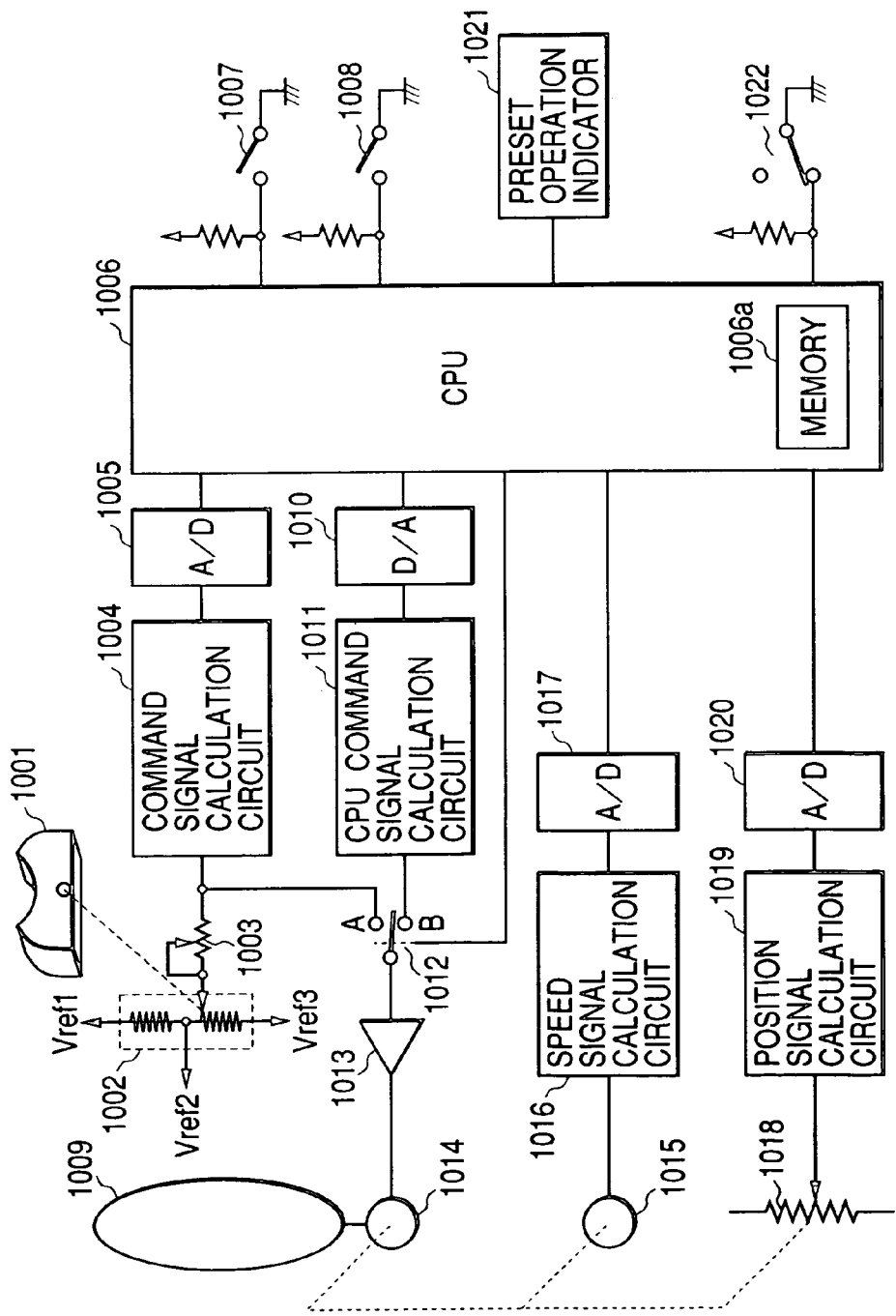
FIG. 17 is a view showing the configuration of a lens apparatus constituting a fifth embodiment of the present invention.

FIG. 17 is a view showing the configuration of a lens apparatus of the present embodiment, wherein components equivalent to those in the fourth embodiment are represented by symbols same as those in the fourth embodiment.

In the present embodiment, the configuration of the fourth embodiment is additionally provided with a preset mode selector switch (speed selecting operation means) 1022 for selecting the drive speed of the zooming optical system 1009 during the preset operation either at the preset speed or at the maximum speed.

The preset speed zoom switch 1007, the memory switch 1008 and the preset mode selector switch 1022 may be provided integrally in the main body of the lens apparatus having the zooming optical system 1009 and an unrepresented focusing optical system, or in a zoom demand (external control unit) which is connected to the main body of the lens apparatus for example through a cable and is provided for example with a thumb ring functioning in place for the zoom control switch 1001.

Also the above-described components other than the zooming optical system 1009, namely the zoom control switch 1001, circuits such as the CPU 1006, motor 1014, speed detector 1015, position detector 1018, preset speed zoom switch 1007, memory switch 1008 and preset mode selector switch 1022, may be provided in a lens drive unit (optical apparatus driving unit) which is to be mounted on or connected to the main body of the lens apparatus of handy type.

In the lens apparatus or the lens drive unit of the above-described configuration, it is necessary to motor drive the zooming optical system 1009 in advance, in order to memorize the preset speed and the preset direction, as in the fourth embodiment.

Also the method of drive control for the zooming optical system 1009 from the zoom control switch 1001, the method of detecting the drive speed and drive direction of the zooming optical system 1009, required for memorizing the preset speed and the preset direction, and the method of discriminating whether the zoom control switch 1001 is operated, required in memorizing the preset speed and the preset direction, are same as those in the fourth embodiment.

In the following there will be explained the preset operation in the present embodiment. Also the control of the zooming optical system 1009 in the preset operation of the present embodiment is similar to that of the fourth embodiment in that such control is executed by the supply of the command signal from the CPU 1006 to the motor 1014 through the D/A converting circuit 1010, the CPU command signal calculation circuit 1011, the side B of the command signal selector switch 1012, and the power amplifying circuit 1013, but is different in that a preset mode in which the CPU 1006 outputs a command signal for driving the zooming optical system 1009 with the preset speed or a maximum speed mode in which the CPU 1006 outputs a command signal for driving with the maximum speed is selectively set according to the state of the preset mode selector switch 1022. However, in either mode, the drive is executed to the end of the movable range of the zooming optical system 1009 (or to a position of interruption in case the preset speed zoom control is interrupted).

Figure 18B:
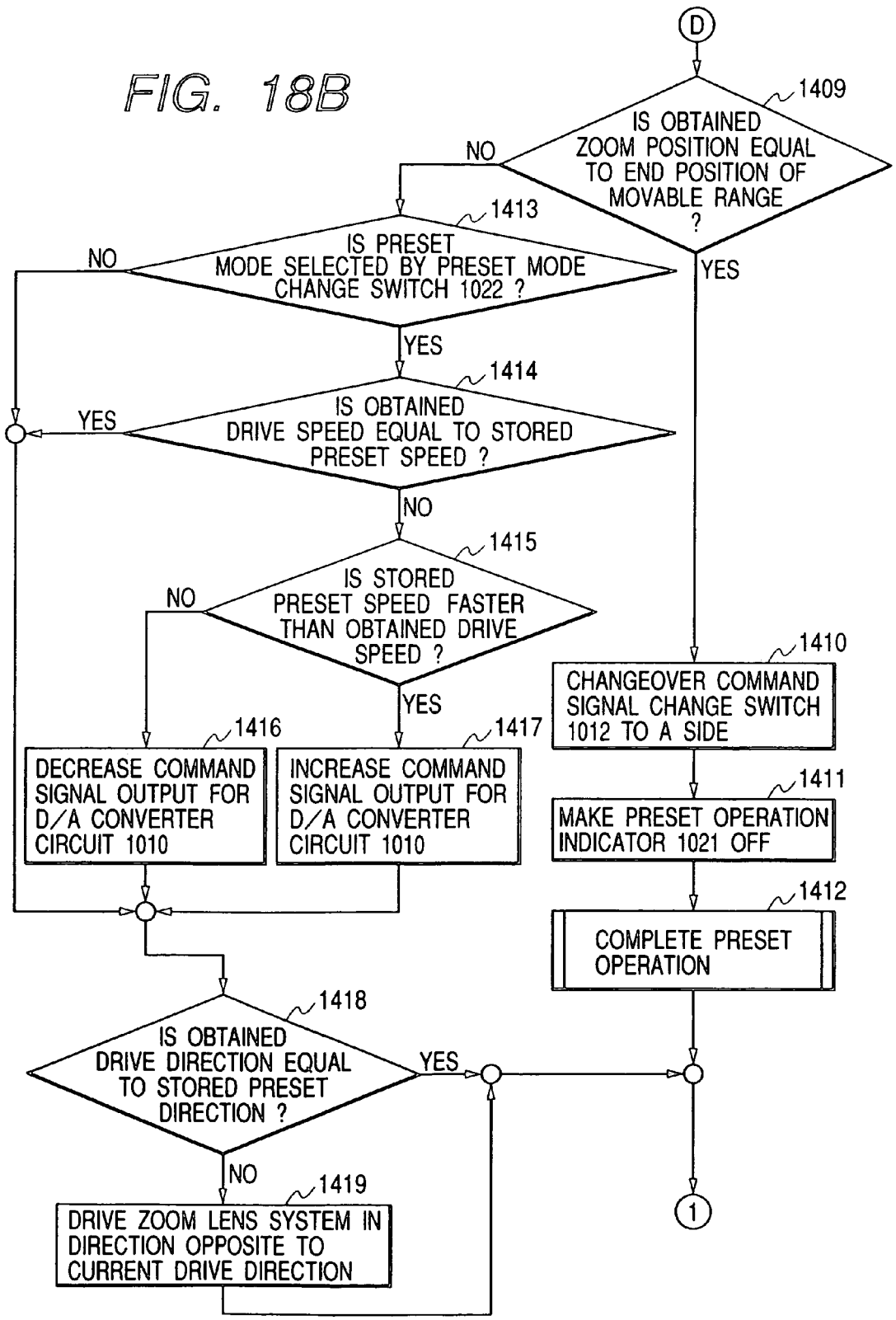
FIG. 18, which is comprised of FIGS. 18A and 18B, and FIG. 19 are process flow charts in the preset speed zoom control in the lens apparatus of the fifth embodiment.
Figure 19:
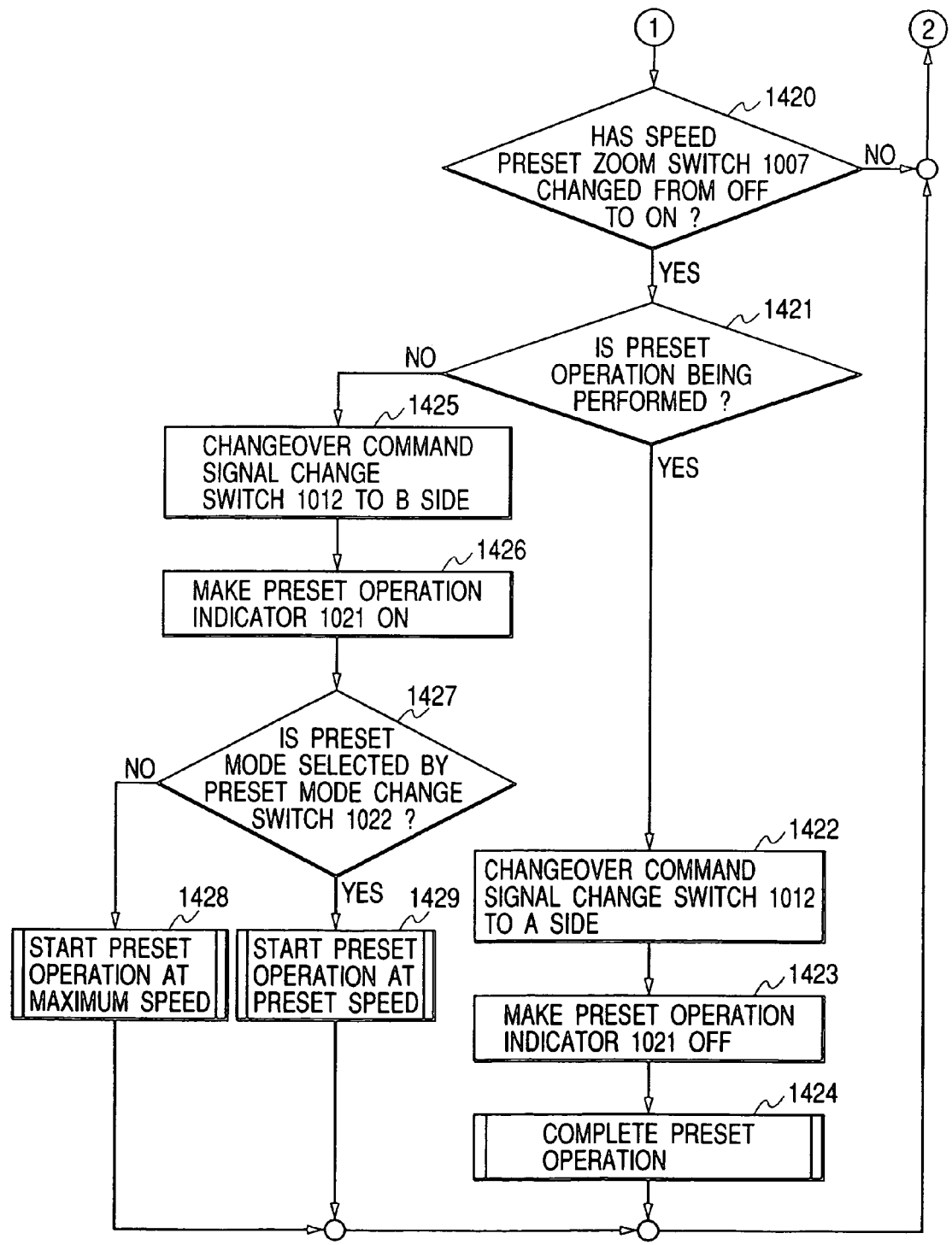
Figure 20:
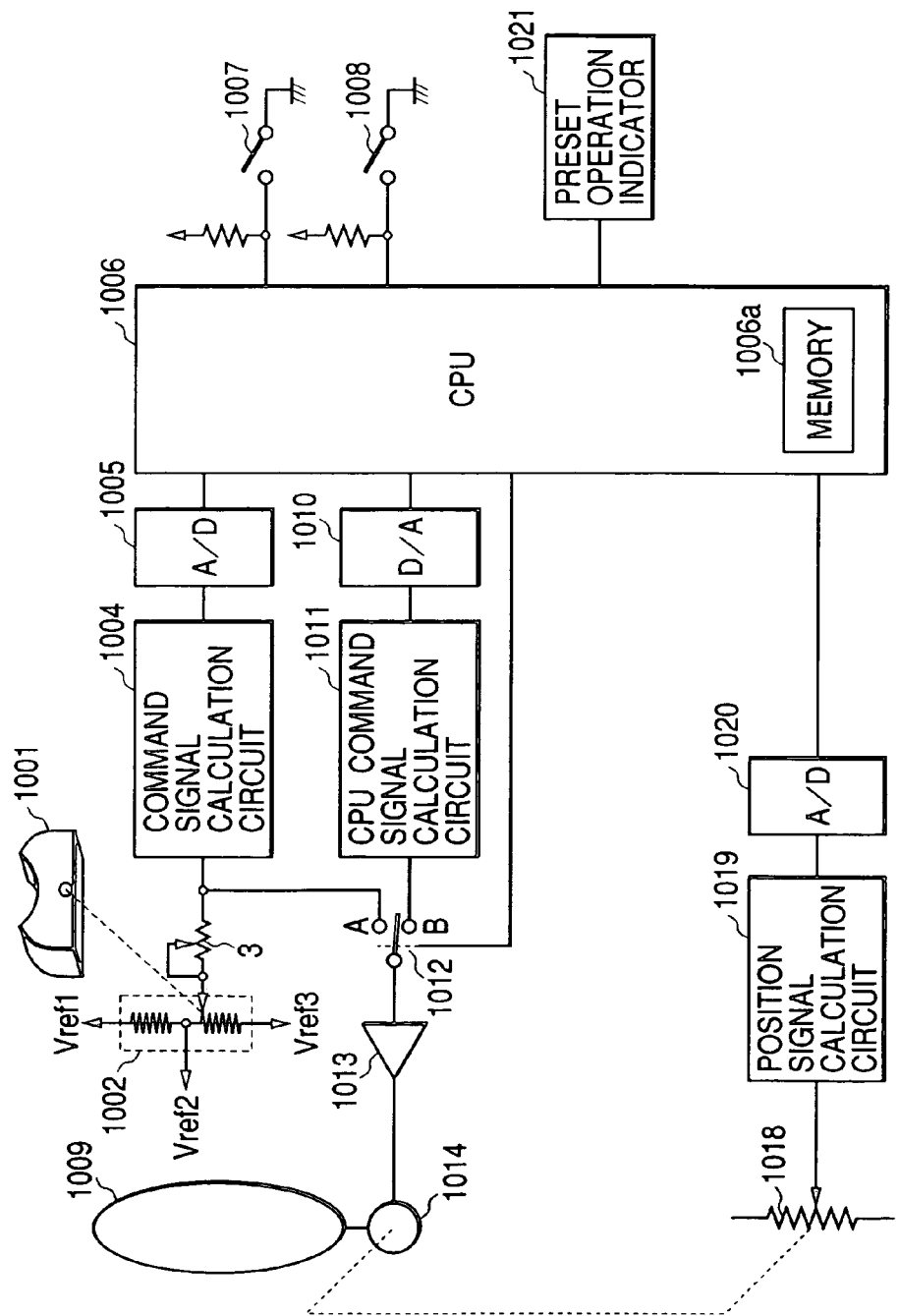
FIG. 20 is a view showing the configuration of a lens apparatus constituting a sixth embodiment of the present invention.

The process of the CPU 1006 in the above-described sequence will be explained with reference to FIGS. 18A, 18B and 19. At first there is discriminated whether the zoom control switch 1001 is operated (step S1401), and, if operated, the command signal selector switch 1012 is shifted to the side A in order to control the zooming optical system 1009 from the zoom control switch 1001 (step S1402).

Then there is discriminated wither the preset operation is executed (step S1403), and, if not executed, the sequence returns again to the discrimination whether the zoom control switch 1001 is operated (step S1401).

In case the step S1403 identifies that the preset operation is executed, the preset operation indicator 1021 is turned off (step S1404) and the preset operation is thereafter terminated (interrupted) (step S1405), whereupon the sequence returns to the discrimination whether the zoom control switch 1001 is operated (step S1401).

On the other hand, if the step S1401 identifies that the zoom control switch 1001 is not operated, there is discriminated whether the preset operation is executed (step S1406), and, if not executed, the sequence proceeds to a step S1420.

In case the step S1406 identifies that the preset operation is executed, the speed and the direction of the zooming optical system 1009 are acquired from the A/D conversion circuit 1017 (step S1407), and then the position of the zooming optical system 1009 is acquired from the A/D conversion circuit 1020 (step S1408).

Then there is discriminated whether the zoom position acquired in the step S1408 has reached an end of the movable range in the lens apparatus (step S1409), and, if the zoom position has reached the end of the movable range, the command signal selector switch 1012 is shifted to the side A (step S1410) and the preset operation indicator 1021 is turned off (step S1411), whereupon the preset operation is terminated (step S1412).

In case the step S1409 identifies that the zoom position has not reached the end of the movable range, there is discriminated whether the preset mode selector switch 1022 selects the preset mode (step S1413).

In case the preset mode is selected, there is discriminated whether the zoom speed acquired in the step S1407 is equal to the preset speed memorized in advance in the memory 1006*a* by the flow shown in FIG. 14 and explained in the fourth embodiment (more specifically whether the zoom speed is within a predetermined tolerance with respect to the preset speed) (step S1414).

In case the zoom speed is not equal to the preset speed, there is discriminated whether the preset speed is larger than the zoom speed (step S1415), and, if larger, the command signal output to the D/A conversion circuit 1010 is increased (step S1417). Also in case the preset speed is smaller than the zoom speed, the command signal output to the D/A conversion circuit 1010 is decreased (step S1416).

Then there is discriminated whether the zoom direction acquired in the step S1407 is equal to the preset direction memorized in advance (step S1418), and, if not equal, the zooming optical system 1009 is driven in a direction opposite to the current zoom direction (step S1419).

In case the preset mode is not selected or in case the zoom speed is equal to the preset speed, the sequence proceeds to a step S1418.

After the above-described processes, there is discriminated whether the preset speed zoom switch 1007 (represented as preset zoom switch in FIGS. 18A, 18B and 19) has been shifted from the off-state to the on-state (step S1420), and, if not shifted, the sequence returns to the discrimination whether the zoom control switch 1001 is operated (step S1401).

On the other hand, if the preset speed zoom switch 1007 has been shifted from the off-state to the on-state, there is discriminated whether the preset operation is executed (step S1421), and, if not executed, the command signal selector switch 1012 is shifted to the side B (step S1425) and the preset operation indicator 1021 is turned on (step S1426). Then there is discriminated whether the preset mode is selected by the preset mode selector switch 1022 (step S1427), and, if not selected, the preset operation is initiated with the maximum drivable speed (step S1428). Also if the preset mode is selected, the preset operation is initiated with the preset speed (step S1429).

Thereafter, when the zooming optical system 1009 reaches the end of the movable range (step S1409), the command signal selector switch 1012 is shifted to the side A (step S1410) and the preset operation indicator 1021 is turned off (step S1411) whereupon the preset operation is terminated (step S1412).

On the other hand, in case the step S1421 identifies that the preset operation is executed, the command signal selector switch 1012 is shifted to the side A (step S1422) and the preset operation indicator 1021 is turned off (step S1423) whereupon the preset operation is terminated (interrupted) (step S1424).

In the present embodiment, as explained in the foregoing, the operator is rendered capable of arbitrarily selecting whether to execute the preset operation with the preset speed or with the maximum speed drivable in the lens apparatus, in addition to the effects obtainable in the fourth embodiment, thereby realizing a more effective preset function and expanding the range of the image taking techniques in television or video image taking.

In the foregoing fourth and fifth embodiments there has been explained a case of obtaining the preset speed, to be used in the preset operation, from the actual drive speed of the zooming optical system 1009, but the preset speed may also be obtained from a speed command signal corresponding to the operation of the zoom control switch 1001.

Also in the foregoing fourth and fifth embodiments there has been explained a case of detecting the drive speed and the drive direction of the zooming optical system 1009 from a speed signal outputted from the speed detector 1015, but the drive speed and the drive direction may also be detected by acquiring the position signal outputted from the position detector at a constant interval.

Sixth Embodiment

In the foregoing fourth embodiment, there has been explained the "preset speed zoom control" or the preset operation in which the preset speed and the preset direction to be used therein are obtained from the actual drive speed and the actual drive direction of the zooming optical system 1009 and the actual drive speed of the zooming optical system 1009 is increased or decreased so as to become equal to the preset speed, but it is also possible to achieve simpler control with a simpler circuit configuration, by obtaining the preset speed (command) and the preset direction (command) from a speed command signal corresponding to the operation amount of the zoom control switch 1001 and a command signal corresponding to the direction of operation of the zoom control switch 1001 while dispensing with the above-mentioned speed increasing/decreasing control. In this manner the speed detector 1015, speed signal calculation circuit 1016 and A/D conversion circuit 1017 in the fourth embodiment can be dispensed with.

Figure 21:
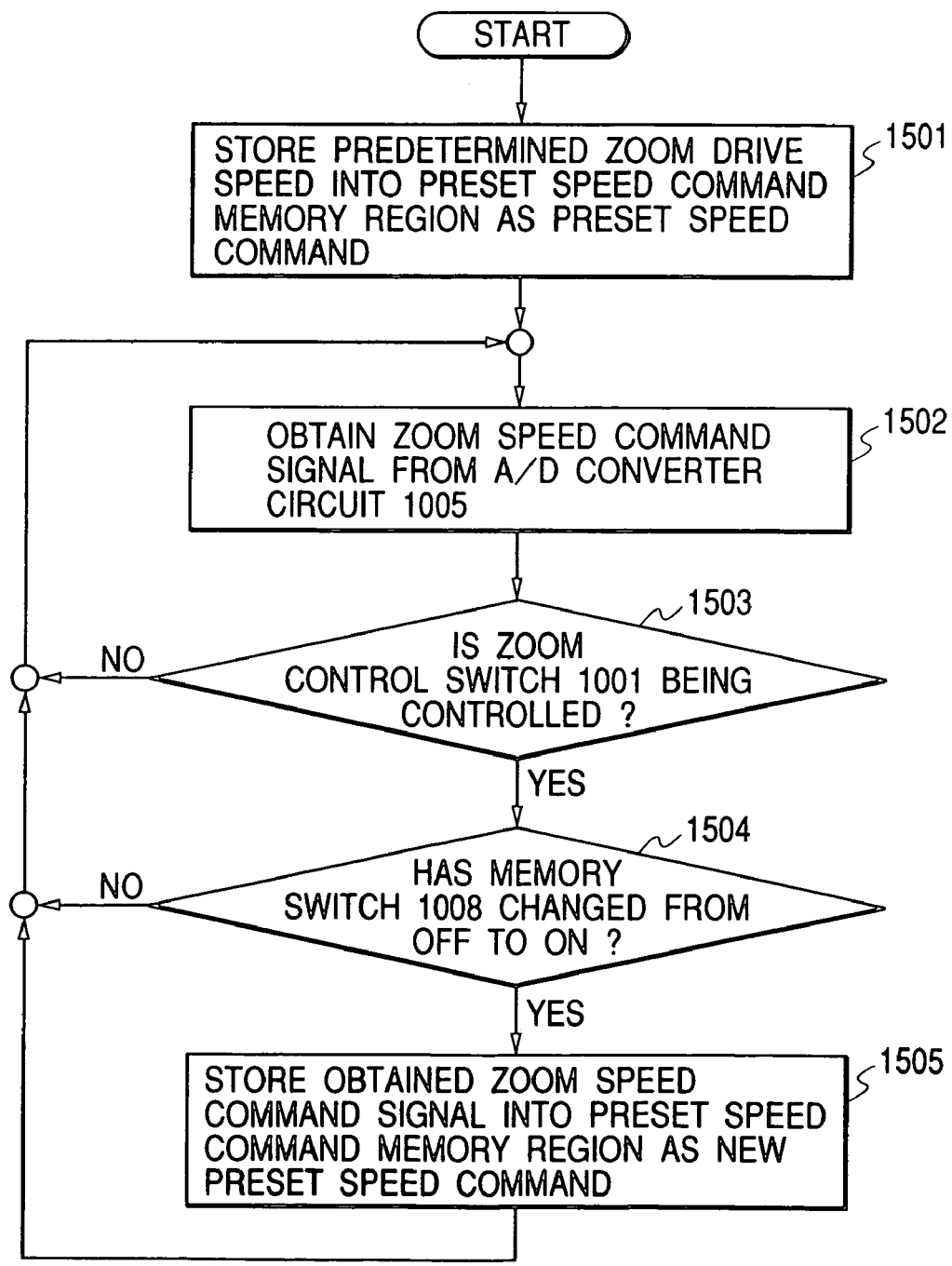
FIG. 21 is a memory setting flow chart for a preset speed (direction) to be employed in the preset speed zoom control in the sixth embodiment.

FIG. 21 shows the configuration of a lens apparatus of the present embodiment, wherein components equivalent to those in the fourth embodiment are represented by symbols same as those in the fourth embodiment.

The configuration of the present embodiment is composed by eliminating the speed detector 1015, the speed signal calculation circuit 1016 and the A/D conversion circuit 1017 are eliminated from the configuration of the fourth embodiment.

The preset memory position zoom switch 1007 and the memory switch 1008 may be provided integrally in the main body of the lens apparatus having the zooming optical system 1009 and an unrepresented focusing optical system, or in a zoom demand (external control unit) which is connected to the main body of the lens apparatus for example through a cable and is provided for example with a thumb ring functioning in place for the zoom control switch 1001.

Also the above-described components other than the zooming optical system 1009, namely the zoom control switch 1001, circuits such as the CPU 1006, motor 1014, position detector 1018, preset speed zoom switch 1007 and memory switch 1008, may be provided in a lens drive unit (optical apparatus driving unit) which is to be mounted on or connected to the main body of the lens apparatus of handy type.

In the lens apparatus or the lens drive unit of the above-described configuration, it is necessary to operate the zoom control switch 1001 and to motor drive the zooming optical system 1009 in advance for memorizing the preset speed and the preset direction, as in the fourth embodiment.

Also the method of drive control for the zooming optical system 1009 from the zoom control switch 1001 is same as that in the fourth embodiment.

Also the detection, required in memorizing the preset speed, of the speed command signal outputted from the command signal generation circuit 1002 according to the operation amount of the zoom control switch 1001 can be achieved by the supply of the speed command signal to the CPU 1006 through the zoom speed controlling variable resistor 1003, command signal calculation circuit 1004 and A/D conversion circuit 1005. In the present embodiment, the speed command signal contains the direction command signal corresponding to the operating direction of the zoom control switch 1001. Also there can be similarly discriminated whether the zoom control switch 1001 is operated.

The memory setting sequence (process of the CPU 1006) for the preset speed (and preset direction) in the present embodiment will be explained with reference to FIG. 21.

At first, as an initialization, a predetermined zoom driving speed, such as the maximum speed in the telephoto direction, is memorized as a preset speed command including the direction command in a preset speed command memory area provided in the memory 1006a (step S1501).

Then the speed command signal is acquired from the A/D conversion circuit 1005 (step S1502). Then there is discriminated whether the zoom control switch 1001 is operated (step S1503), and, if not operated, the speed command signal is acquired again from the A/D conversion circuit 1005 (step S1502).

In case the zoom control switch 1001 is operated, there is discriminated whether the memory switch 1008 has been shifted from the off-state to the on-state (step S1504), and, if not shifted, the sequence returns to the step S1502.

In case the memory switch 1008 has been shifted from the off-state to the on-state, the speed command signal including the direction command acquired in the step S1502 is memorized as a new preset speed command in the preset speed command memory area (step S1505).

In the following there will be explained the preset operation in the present embodiment. Also in the preset operation of the present embodiment, the zooming optical system 1009 is controlled by the supply of the command signal from the CPU 1006 to the motor 1014 through the D/A conversion circuit 1010, the CPU command signal calculation circuit 1011, the side B of the command signal selector switch 1012 and the power amplifying circuit 1013, whereby the zooming optical system 1009 is driven with the speed and direction corresponding to the preset speed command.

Figure 22:
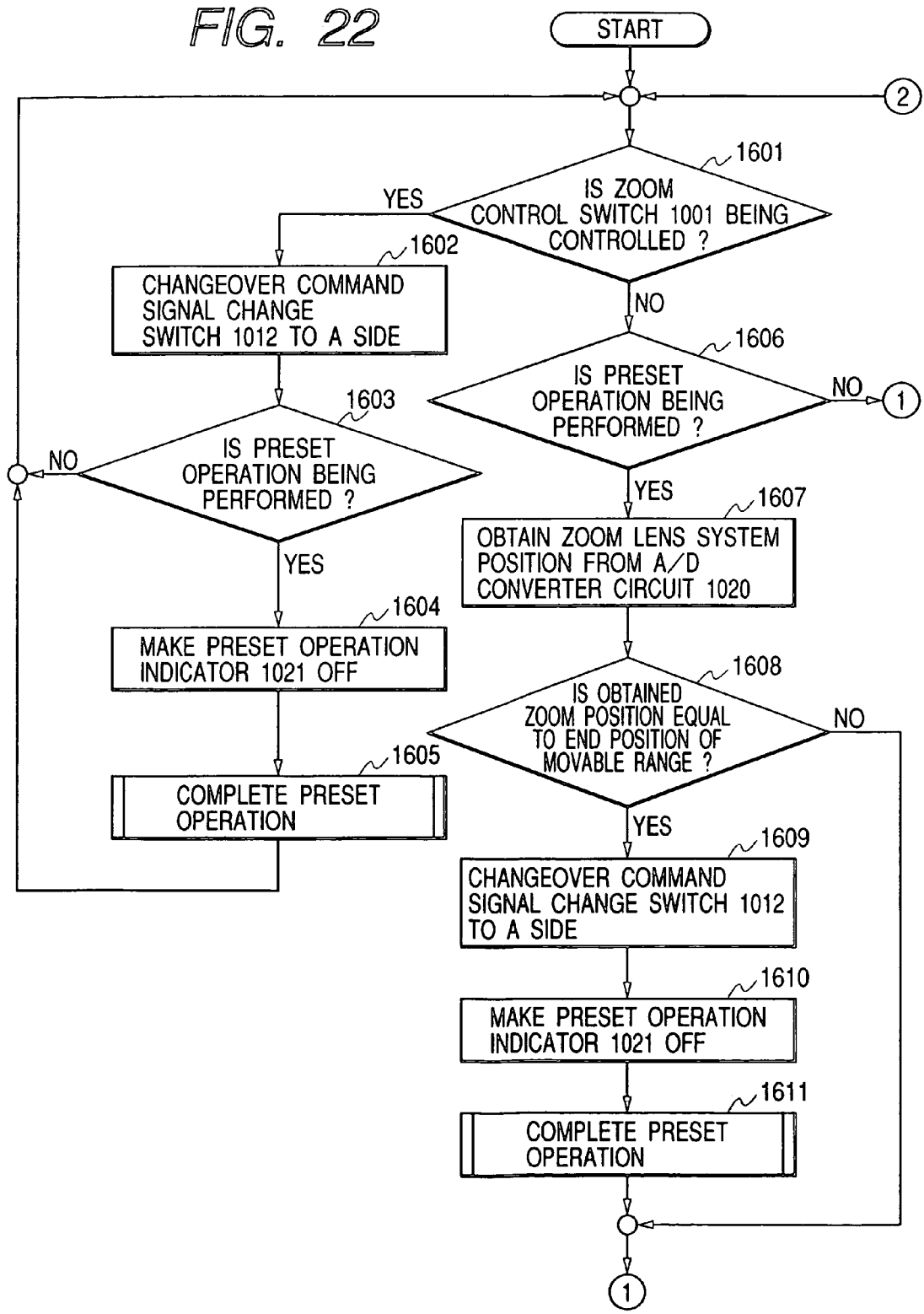
FIGS. 22 and 23 are process flow charts in the preset speed zoom control in the lens apparatus of the sixth embodiment.
Figure 23:
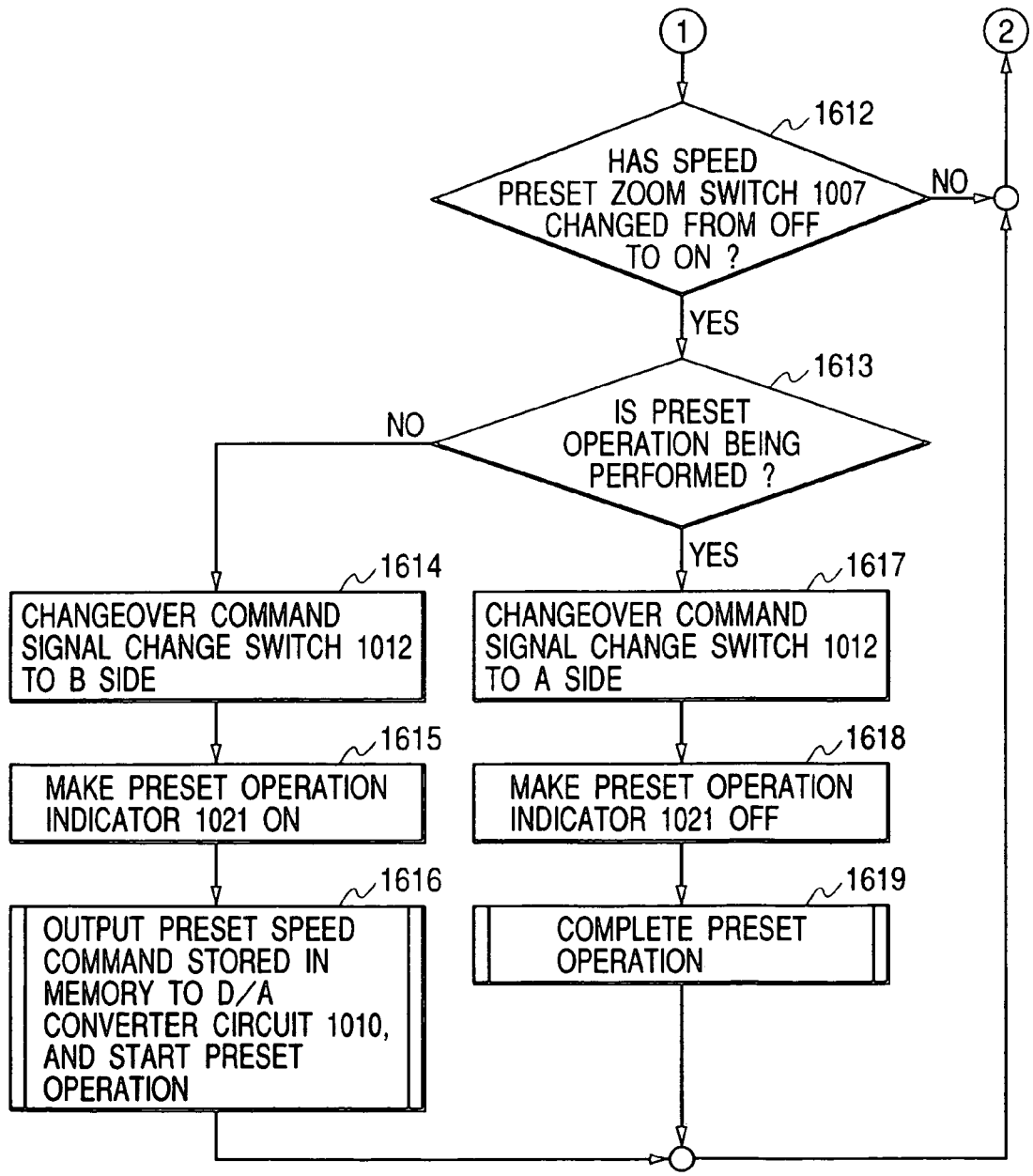

The process of the CPU 1006 in the above-described preset operation will be explained with reference to FIGS. 22 and 23. At first, there is discriminated whether the zoom control switch 1001 is operated (step S1601), and, if operated, the command signal selector switch 1012 is shifted to the side A in order to control the zooming optical system 1009 from the zoom control switch 1001 (step S1602). Then there is discriminated whether the preset operation is executed (step S1603), and, if not executed, the sequence returns to the discrimination whether the zoom control switch is operated (step S1601).

In case the step S1603 identifies that the preset operation is executed, the preset operation indicator 1021 is turned off (step S1604) and the preset operation is thereafter terminated (interrupted) (step S1605). Then the sequence returns to the discrimination whether the zoom control switch is operated (step S1601).

On the other hand, in case the step S1601 identifies that the zoom control switch 1001 is not operated, there is discriminated whether the preset operation is executed (step S1606), and, if not, the sequence proceeds to a step S1612.

In case the step S1606 identifies that the preset operation is executed, the zoom position is acquired from the A/D conversion circuit 1020 (step S1607).

Then there is discriminated whether the zoom position acquired in the step S1607 has reached an end position in the movable range in the present lens apparatus (step S1608), and, if the end position has been reached, the command signal selecting switch 1012 is shifted to the side A (step S1609) and the preset operation indicator 1021 is turned off (step S1610) whereupon the preset operation is terminated (step S1611).

In case the step S1609 identifies that the zoom position has not reached the end position of the movable range, the sequence proceeds to a step S1612.

After the above-described processes, there is discriminated whether the preset speed zoom switch 1007 has been shifted from the off-state to the on-state (step S1612), and, if not shifted, the sequence returns to the discrimination whether the zoom control switch 1001 is operated (step S1601).

On the other hand, if the preset memory position zoom switch 1007 has been shifted from the off-state to the on-state, there is discriminated whether the preset operation is executed (step S1613), and, if not executed, the command signal selector switch 1012 is shifted to the side B (step S1614) and the preset operation indicator 1021 is turned on (step S1615). Then the preset speed command memorized in advance by the flow shown in FIG. 21 is outputted to the D/A conversion circuit 1010, and the preset operation is initiated with a speed and a direction corresponding to the preset speed command (step S1616).

Thereafter, when the zooming optical system 1009 reaches the end of the movable range (step S1608), the command signal selector switch 1012 is shifted to the side A (step S1609) and the preset operation indicator 1021 is turned off (step S1610) whereupon the preset operation is terminated (step S1611).

On the other hand, in case the step S1613 identifies that the preset operation is executed, the command signal selector switch 1012 is shifted to the side A (step S1617) and the preset operation indicator 1021 is turned off (step S1618) whereupon the preset operation is terminated (interrupted) (step S1619).

In the present embodiment, as explained in the foregoing, there is enabled a preset operation of driving the zooming optical system 1009 with the speed and direction arbitrarily selected by the operator for example by the operation of the memory switch 1008 and memorized in the memory 1006*a*, whereby the zooming optical system 1009 can be driven with a constant speed by an extremely simple operation. Also the constant speed drive of the zooming optical system 1009 can be exactly reproduced with a same speed by merely turning on the preset speed zoom switch 1007.

Also in the present embodiment, the preset operation indicator 1021 is turned on in case of executing the preset operation, thereby enabling the operator to clearly recognize whether the preset operation is being executed even in the course of a preset operation at a low speed.

In the foregoing fourth to sixth embodiments there has been explained a case of obtaining both the preset speed and the preset direction from the actual drive state of the zooming optical system 1009 or from the drive command generated in response to the operation of the zoom control switch 1001, but it is also possible to obtain either of the preset speed and the preset direction from the actual drive state and the other from the drive command.

Also in the foregoing fourth to sixth embodiments, the preset speed is memorized after discriminating that the zoom control switch 1001 is operated, but it is also possible to memorize the preset speed after discriminating that the zooming optical system 1009 is drive for example through a change in the position signal outputted from position detector.

Also in the foregoing fourth to sixth embodiments, there has been explained a case where the memory switch 1008 is composed of a single switch, but it is also possible to utilize the two memory switches constructed as a single set for avoiding erroneous operation and to memorized the preset information in response to the operation of such memory switches.

Also in the foregoing fourth to sixth embodiments, there has been explained a case of executing the preset drive control relating to the zooming optical system, but the present invention is likewise applicable to the preset drive control of optical adjustment means other than the zooming optical system, such as a focusing optical system or an iris.

Also in the foregoing embodiments, the memory of the preset position is executed by shifting the preset memory position switch 7 from the off-state to the on-state while the memory switch 8, but such memory of the preset position may also be executed in response to the simultaneous turning-on of the memory switch 8 and the preset memory position switch 7.

Also in the foregoing first to third embodiments, there has been explained a case where the memory switch 1008 is composed of a single switch, but it is also possible to utilize the two memory switches constructed as a single set for avoiding erroneous operation and to memorized the preset information in response to the operation of such memory switches.

Also in the foregoing first to third embodiments, there has been explained a case of executing the preset drive control relating to the zooming optical system, but the present invention is likewise applicable to the preset drive control of optical adjustment means other than the zooming optical system, such as a focusing optical system or an iris.

According to the first invention of the present application, as explained in the foregoing, there is realized preset position/speed drive control capable of setting the drive speed, for driving the optical adjustment means to a position corresponding to the preset position information, at the speed arbitrarily selected and memorized by the operator with the operation of the memory instructing operation means, whereby there can be dispensed with the complex speed changing operation which is conventionally required in the use of the conventional preset position drive controlling function, and there can be resolved the conventional drawback that the drive speed of the optical adjustment means cannot be set very low in the execution of the preset position drive control.

Also the presence of display means for visual judgment that the preset position/speed drive control is executed allows the operator of the optical apparatus or the drive unit, rendered capable of the preset drive control of the optical adjustment means at a lower speed, to clearly recognize that the preset position/speed drive control is being executed.

Also in a preferred embodiment of the first invention, it is rendered possible to select the drive speed of the optical adjustment means either at the drive speed corresponding to the preset speed information or at the maximum drivable speed, whereby the range of the image taking techniques utilizing the preset position/speed drive control can be widened and the preset drive control function can be made more efficient.

Also according to the second invention, there is realized preset position/speed drive control capable of executing the drive with the speed and direction arbitrarily selected and memorized by the operator with the operation of the memory instructing operation means, whereby the optical adjustment means can be driven with a constant speed by an extremely simple operation. Besides the constant speed drive can be exactly reproduced with a same speed.

Also the presence of display means for visual judgment that the preset position/speed drive control is executed allows, in case of the preset speed/direction drive control of the optical adjustment means particularly at a low speed, the operator to clearly recognize that the preset position/speed drive control is being executed.

Also in a preferred embodiment of the second invention, there is provided speed selecting operation means for selecting the drive speed of the optical adjustment means either at the drive speed corresponding to the preset speed information or at the maximum drivable speed and the optical adjustment means is driven with the drive speed selected by such speed selecting operation means, so that the range of the image taking techniques utilizing the preset position/speed drive control can be widened and the preset drive control function can be made more efficient.

What is claimed is:

1. An optical apparatus comprising:
a zoom lens;
a memory means for memorizing preset speed information and preset direction information;
a memory instructing operation means to be operated for causing said memory means to memorize the preset speed information and the preset direction information;
a drive instructing operation means to be operated for generating a drive speed command and a drive direction command for said zoom lens corresponding to the operation amount and the operation direction; and
a control means for executing preset drive control on said zoom lens,
wherein said control means is adapted, when said zoom lens is driven and said memory instructing operation means is operated, to cause said memory means to memorize the actual drive speed and the actual drive direction of said zoom lens as the preset speed information and the preset direction information, and to drive said zoom lens with a speed corresponding to said memorized preset speed information and in a direction corresponding to said memorized preset direction information in response to the operation of control starting operation means while the drive instructing operation means is not operated.

2. The optical apparatus according to claim 1, wherein said control means is adapted, in the execution of said preset drive control, to compare the actual drive speed of said optical member with a drive speed corresponding to the preset speed information and to control to increase or to decrease the actual drive speed of said optical member in such a manner that said two drive speeds substantially coincide.

3. The optical apparatus according to claim 1, further comprising display means for displaying that said preset drive control is executed.

4. The optical apparatus according to claim 1, further comprising:
speed selecting operation means to be operated for selecting the drive speed of said optical member either at a drive speed corresponding to the preset speed information or at a maximum drivable speed;
wherein said control means is adapted to drive said optical member with the drive speed selected by said speed selecting operation means.

5. The optical apparatus according to claim 1, wherein said control means is adapted to interrupt said preset drive control in response to the operation of said control starting operation means in the course of said preset drive control.

6. The optical apparatus according to claim 5, wherein said control means is adapted to restart said preset drive control in response to the operation of said control starting operation means after the interruption.

7. An optical apparatus comprising:
a zoom lens;
a memory means for memorizing preset speed information and preset direction information;
a memory instructing operation means to be operated for causing said memory means to memorize the preset speed information and the preset direction information;
a drive instructing operation means to be operated for generating a drive speed command and a drive direction command for said zoom lens corresponding to the operation amount and the operation direction; and
a control means for executing preset drive control on said zoom lens,
wherein said control means is adapted, when said drive instruction operation means is operated and said memory instructing operation means is operated, to cause said memory means to memorize the drive speed command and the drive direction command of said zoom lens as the preset speed information and the preset direction information, and to drive said zoom lens with a speed corresponding to said memorized preset speed information and in a direction corresponding to said memorized preset direction information in response to the operation of control starting operation means while the drive instructing operation means is not operated.

8. The optical apparatus according to claim 7, wherein said control means is adapted, in the execution of said preset drive control, to compare the actual drive speed of said optical member with a drive speed corresponding to the preset speed information and to control to increase or decrease the actual drive speed of said optical member in such a manner that said two drive speeds substantially coincide.

9. The optical apparatus according to claim 7, further comprising display means for displaying that said preset drive control is executed.

10. The optical apparatus according to claim 7, further comprising:
speed selecting operation means to be operated for selecting the drive speed of said optical member either at a drive speed corresponding to the preset speed information or at a maximum drivable speed;
wherein said control means is adapted to drive said optical member with the drive speed selected by said speed selecting operation means.

11. The optical apparatus according to claim 7, wherein said control means is adapted to interrupt said preset drive control in response to the operation of said control starting operation means in the course of said preset drive control.

12. The optical apparatus according to claim 11, wherein said control means is adapted to restart said preset drive control in response to the operation of said control starting operation means after the interruption.

13. The optical apparatus according to claim 7, further comprising:
drive instructing operation means to be operated for generating a drive command for said optical member according to at least either of the operation amount and the operation direction;
wherein said control means is adapted to interrupt said preset drive control in response to the operation of said drive instructing operation means in the course of said preset drive control.

14. The optical apparatus according to claim 13, wherein said control means is adapted to restart said preset drive control in response to the operation of said control starting operation means after the interruption.

15. An optical apparatus drive unit to be mounted on or connected to a main body of an optical apparatus including a zoom lens, the drive unit comprising:
a memory means for memorizing preset speed information and preset direction information;
a memory instructing operation means to be operated for causing said memory means to memorize the preset speed information and the preset direction information;
a drive instructing operation means to be operated for generating a drive speed command and a drive direction command for said zoom lens corresponding to the operation amount and the operation direction; and a control means for executing preset drive control on said zoom lens, wherein said control means is adapted, when said zoom lens is driven and said memory instructing operation means is operated, to cause drive speed and the as the preset speed information, and to said memory means to memorize the actual drive direction of said zoom lens information and the preset direction drive said zoom lens. with a speed corresponding to said memorized preset speed information and in a direction corresponding to said memorized preset direction information in response to the operation of control starting operation means while the drive instructing operation means is not operated.

16. The optical apparatus drive unit according to claim 15, wherein said control means is adapted, in the execution of said preset drive control, to compare the actual drive speed of said optical member with a drive speed corresponding to the preset speed information and to control to increase or decrease the actual drive speed of said optical member in such a manner that said two drive speeds substantially coincide.

17. The optical apparatus drive unit according to claim 15, further comprising display means for displaying that said preset drive control is executed.

18. The optical apparatus drive unit according to claim 15, further comprising speed selecting operation means to be operated for selecting the drive speed of said optical member either at a drive speed corresponding to the preset speed information or at a maximum drivable speed;

wherein said control means is adapted to drive said optical member with the drive speed selected by said speed selecting operation means.

19. The optical apparatus drive unit according to claim 15, wherein said control means is adapted to interrupt said preset drive control in response to the operation of said control starting operation means in the course of said preset drive control.

20. The optical apparatus drive unit according to claim 19, wherein said control means is adapted to restart said preset drive control in response to the operation of said control starting operation means after the interruption.

21. An optical apparatus drive unit to be mounted on or connected to a main body of an optical apparatus including a zoom lens, the drive unit comprising:

a memory means for memorizing preset speed information and preset direction information;

a memory instructing operation means to be operated for causing said memory means to memorize the preset speed information and the preset direction information;

a drive instructing operation means to be operated for generating a drive speed command and a drive direction command for said zoom lens corresponding to the operation amount and the operation direction; and a control means for executing preset drive control on said zoom lens, wherein said control means is adapted, when said drive instruction operation means is operated and said memory instructing operation means is operated, to cause said memory means to memorize the drive speed command and the drive direction command of said zoom lens as the preset speed information and the preset direction information, and to drive said zoom lens with a speed corresponding to said memorized preset speed information and in a direction corresponding to said memorized preset direction information in response to the operation of control starting operation means while the drive instructing operation means is not operated.

22. The optical apparatus drive unit according to claim 21, wherein said control means is adapted, in the execution of said preset drive control, to compare the actual drive speed of said optical member with a drive speed corresponding to the preset speed information and to control to increase or decrease the actual drive speed of said optical member in such a manner that said two drive speeds substantially coincide.

23. The optical apparatus drive unit according to claim 21, further comprising display means for displaying that said preset drive control is executed.

24. The optical apparatus drive unit according to claim 21, further comprising:

speed selecting operation means to be operated for selecting the drive speed of said optical member either at a drive speed corresponding to the preset speed information or at a maximum drivable speed;

wherein said control means is adapted to drive said optical member with the drive speed selected by said speed selecting operation means.

25. The optical apparatus drive unit according to claim 21, wherein said control means is adapted to interrupt said preset drive control in response to the operation of said control starting operation means in the course of said preset drive control.

26. The optical apparatus drive unit according to claim 25, wherein said control means is adapted to restart said preset drive control in response to the operation of said control starting operation means after the interruption.

27. The optical apparatus drive unit according to claim 21, further comprising:

drive instructing operation means to be operated for generating a drive command for said optical member according to at least either of the operation amount and the operation direction;

wherein said control means is adapted to interrupt said preset drive control in response to the operation of said drive instructing operation means in the course of said preset drive control.

28. The optical apparatus drive unit according to claim 27, wherein said control means is adapted to restart said preset drive control in response to the operation of said control starting operation means after the interruption.

29. A camera system including a camera on which an optical apparatus is mounted, the camera system comprising:

a zoom lens;

a memory means for memorizing preset speed information and preset direction information;

a memory instructing operation means to be operated for causing said memory means to memorize the preset speed information and the preset direction information;

a drive instructing operation means to be operated for generating a drive speed command and a drive direction command for said zoom lens corresponding to the operation amount and the operation direction; and a control means for executing preset drive control on said zoom lens, wherein said control means is adapted, when said zoom lens is driven and said memory instructing operation means is operated, to cause said memory means to memorize the actual drive speed and the actual drive direction of said zoom lens as the preset speed information and the preset direction information, and to drive said zoom lens with a speed corresponding to said memorized preset speed information and in a direction corresponding to said memorized preset direction information in response to the operation of control starting operation means while the drive instructing operation means is not operated.

30. The camera system according to claim 29, further comprising
speed selecting operation means to be operated for selecting the drive speed of said optical member either at a drive speed corresponding to the preset speed information or at a maximum drivable speed;
wherein said control means is adapted to drive said optical member with the drive speed selected by said speed selecting operation means.

31. A camera system including a camera on which an optical apparatus is mounted, the camera system comprising:
a zoom lens;
a memory means for memorizing preset speed information and preset direction information;
a memory instructing operation means to be operated for causing said memory means to memorize the preset speed information and the preset direction information;
a drive instructing operation means to be operated for generating a drive speed command and a drive direction command for said zoom lens corresponding to the operation amount and the operation direction; and
a control means for executing preset drive control on said zoom lens, wherein said control means is adapted, when said drive instruction operation means is operated and said memory instructing operation means is operated, to cause said memory means to memorize the drive speed command and the drive direction command of said zoom lens as the preset speed information and the preset direction information, and to drive said zoom lens with a speed corresponding to said memorized preset speed information and in a direction corresponding to said memorized preset direction information in response to the operation of control starting operation means while the drive instructing operation means is not operated.

32. The camera system according to claim 31, further comprising:
drive instructing operation means to be operated for generating a drive command for said optical member according to at least either of the operation amount and the operation direction;
wherein said control means is adapted to interrupt said preset drive control in response to the operation of said drive instructing operation means in the course of said preset drive control.

* * * * *